(12) United States Patent
Drees et al.

(10) Patent No.: US 9,545,090 B2
(45) Date of Patent: Jan. 17, 2017

(54) FISH HOOK SYSTEM

(71) Applicant: DOUBLE CATCH LURES, LLC, Pewaukee, WI (US)

(72) Inventors: Peter J. Drees, Pewaukee, WI (US); Andrew M. Smith, Pewaukee, WI (US); Erik Zabel, Pewaukee, WI (US)

(73) Assignee: Double Catch Lures, LLC, Pewaukee, WI (US)

( * ) Notice: Subject to any disclaimer, the term of this patent is extended or adjusted under 35 U.S.C. 154(b) by 131 days.

(21) Appl. No.: 14/661,813

(22) Filed: Mar. 18, 2015

(65) Prior Publication Data
US 2016/0057986 A1 Mar. 3, 2016

Related U.S. Application Data

(60) Provisional application No. 62/043,582, filed on Aug. 29, 2014.

(51) Int. Cl.
*A01K 97/12* (2006.01)
*A01K 91/10* (2006.01)

(52) U.S. Cl.
CPC .................................. *A01K 91/10* (2013.01)

(58) Field of Classification Search
USPC .............................. 43/15, 16, 4.5
See application file for complete search history.

(56) References Cited

U.S. PATENT DOCUMENTS

| | | | | |
|---|---|---|---|---|
| 1,614,931 A | * | 1/1927 | Pennell | A01K 93/02 24/115 R |
| 2,481,453 A | * | 9/1949 | Stadelhofer | A01K 93/00 43/15 |
| 2,712,194 A | * | 7/1955 | Di Stefano | A01K 93/02 43/15 |
| 2,726,470 A | * | 12/1955 | Bass | A01K 93/02 43/15 |
| 2,755,589 A | * | 7/1956 | Osborne | A01K 93/02 43/15 |
| 2,799,109 A | * | 7/1957 | Remington | A01K 91/10 43/15 |
| 2,801,487 A | * | 8/1957 | Morgan | A01K 91/10 43/15 |
| 3,060,615 A | * | 10/1962 | Spets | A01K 91/10 43/15 |

(Continued)

OTHER PUBLICATIONS

Automatic Fishing Reel Pamphlet from Mechanical Fisher—Date Unknown.

(Continued)

*Primary Examiner* — Christopher P Ellis
(74) *Attorney, Agent, or Firm* — Smith Keane LLP

(57) ABSTRACT

Systems directed to the art of setting a hook in a fish mouth. The systems have a sleeve substantially housing a plunger assembly and a biasing member, and an activation member assembly with a rotatable finger. The biasing member applies force between the plunger assembly engages and the activation member assembly when the system is engaged. A fish hook is attached via fishing lines to both the activation member assembly and the plunger assembly. Pulling the hook releases the plunger assembly from the activation member assembly and pulls the line attached to the plunger assembly, setting the hook in the fish's mouth.

21 Claims, 21 Drawing Sheets

(56) References Cited

U.S. PATENT DOCUMENTS

| | | | | |
|---|---|---|---|---|
| 3,771,250 A * | 11/1973 | Helmke | ............... | A01K 91/10 43/15 |
| 3,823,501 A * | 7/1974 | Bybee | ............... | A01K 91/10 43/15 |
| 4,124,948 A * | 11/1978 | Mautner | ............... | A01K 91/10 43/15 |
| 5,515,638 A * | 5/1996 | Shirley | ............... | A01K 97/00 43/15 |
| 6,105,299 A * | 8/2000 | Rich | ............... | A01K 91/10 43/15 |
| 7,124,534 B1 * | 10/2006 | Kacir | ............... | A01K 91/10 43/15 |
| 7,849,629 B1 * | 12/2010 | Adcock | ............... | A01K 91/10 43/15 |
| 8,196,335 B2 * | 6/2012 | Flecha | ............... | A01K 91/10 43/15 |
| 8,316,577 B2 * | 11/2012 | Hale | ............... | A01K 89/08 43/17.5 |
| 8,448,375 B1 * | 5/2013 | Blankenship | ............... | A01K 93/00 43/19.2 |
| 2007/0289195 A1 * | 12/2007 | Queen | ............... | A01K 91/10 43/15 |
| 2012/0285070 A1 * | 11/2012 | Beayon | ............... | A01K 97/01 43/16 |
| 2016/0015016 A1 * | 1/2016 | Brackett, Sr. | ............... | A01K 97/12 43/15 |

OTHER PUBLICATIONS

Printout from jawjacker.com—first availability unknown.
Photo of speedhook product—first availability unknown.

\* cited by examiner

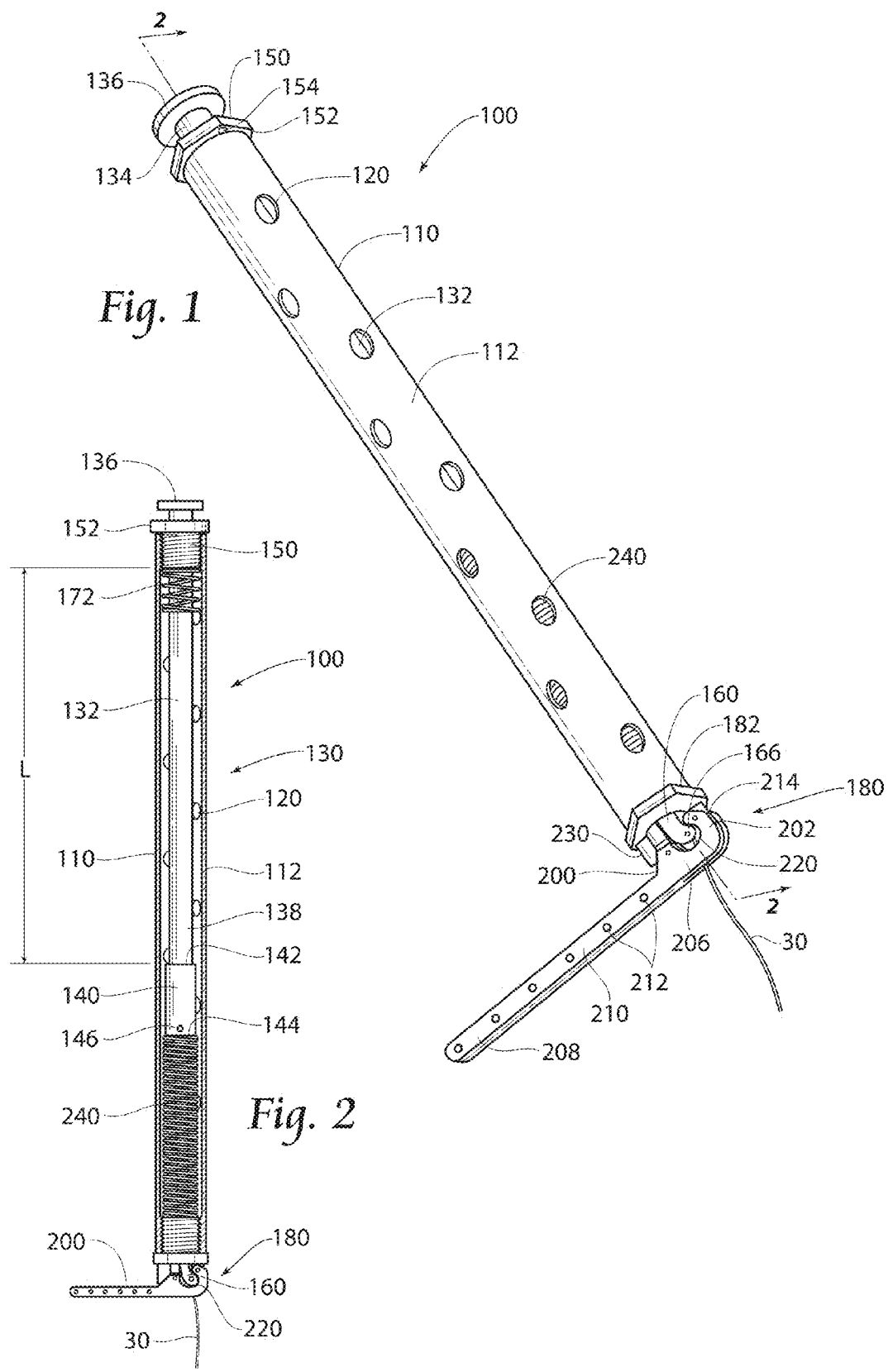

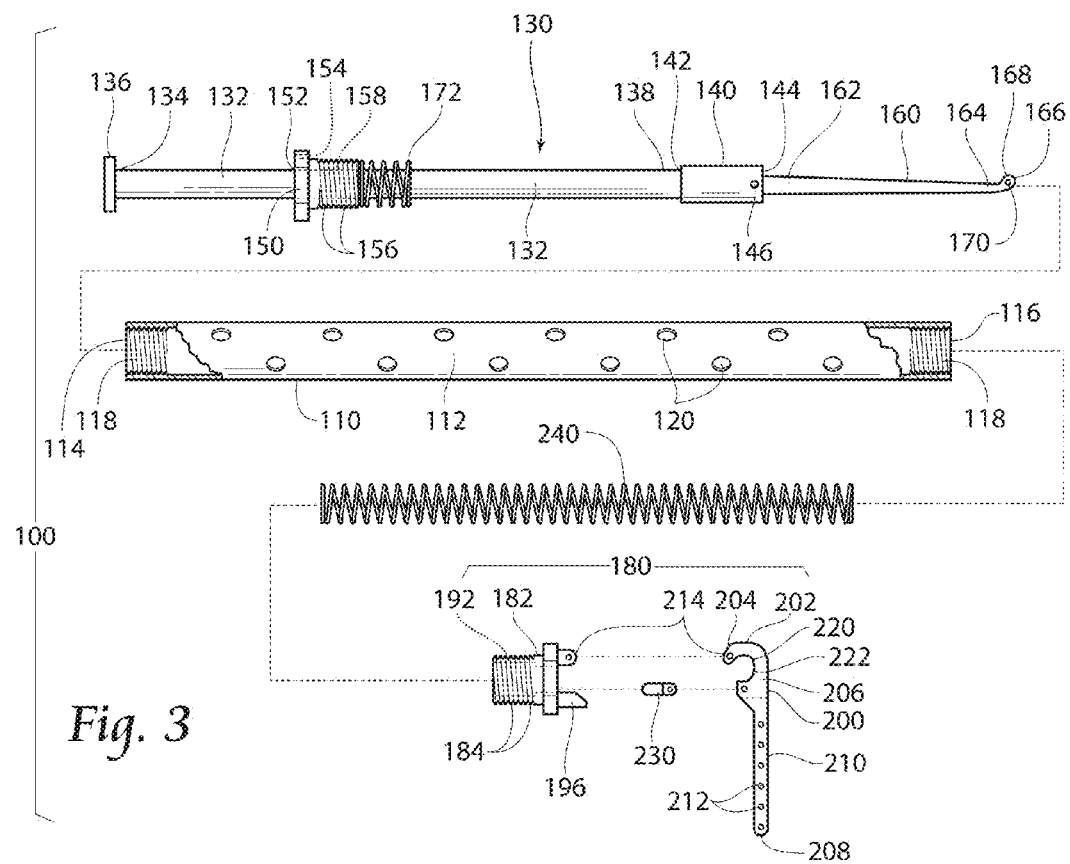
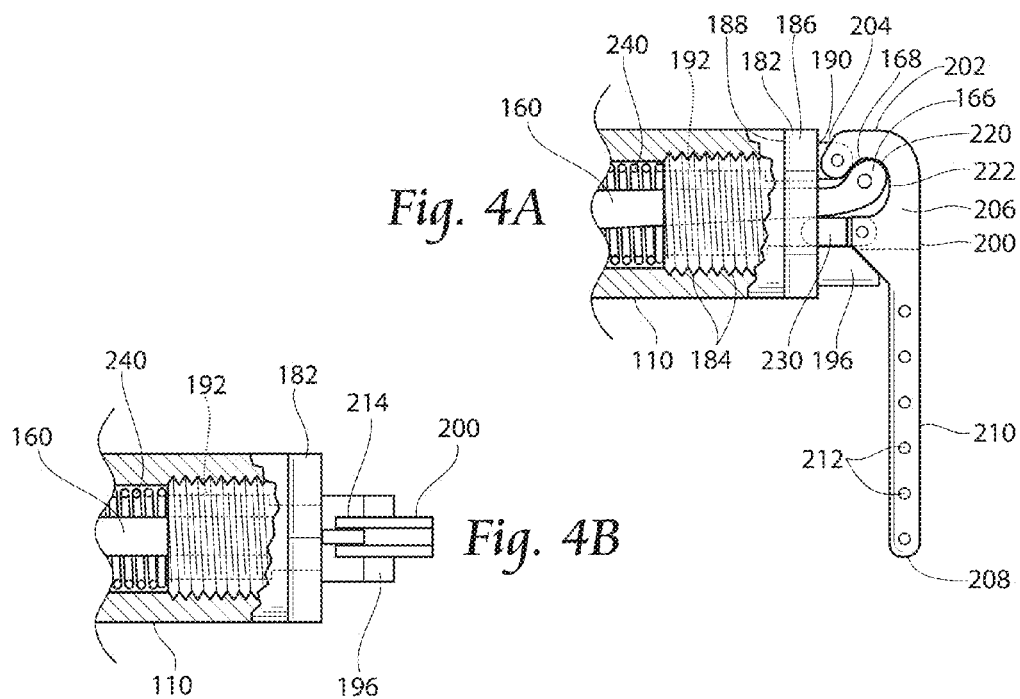

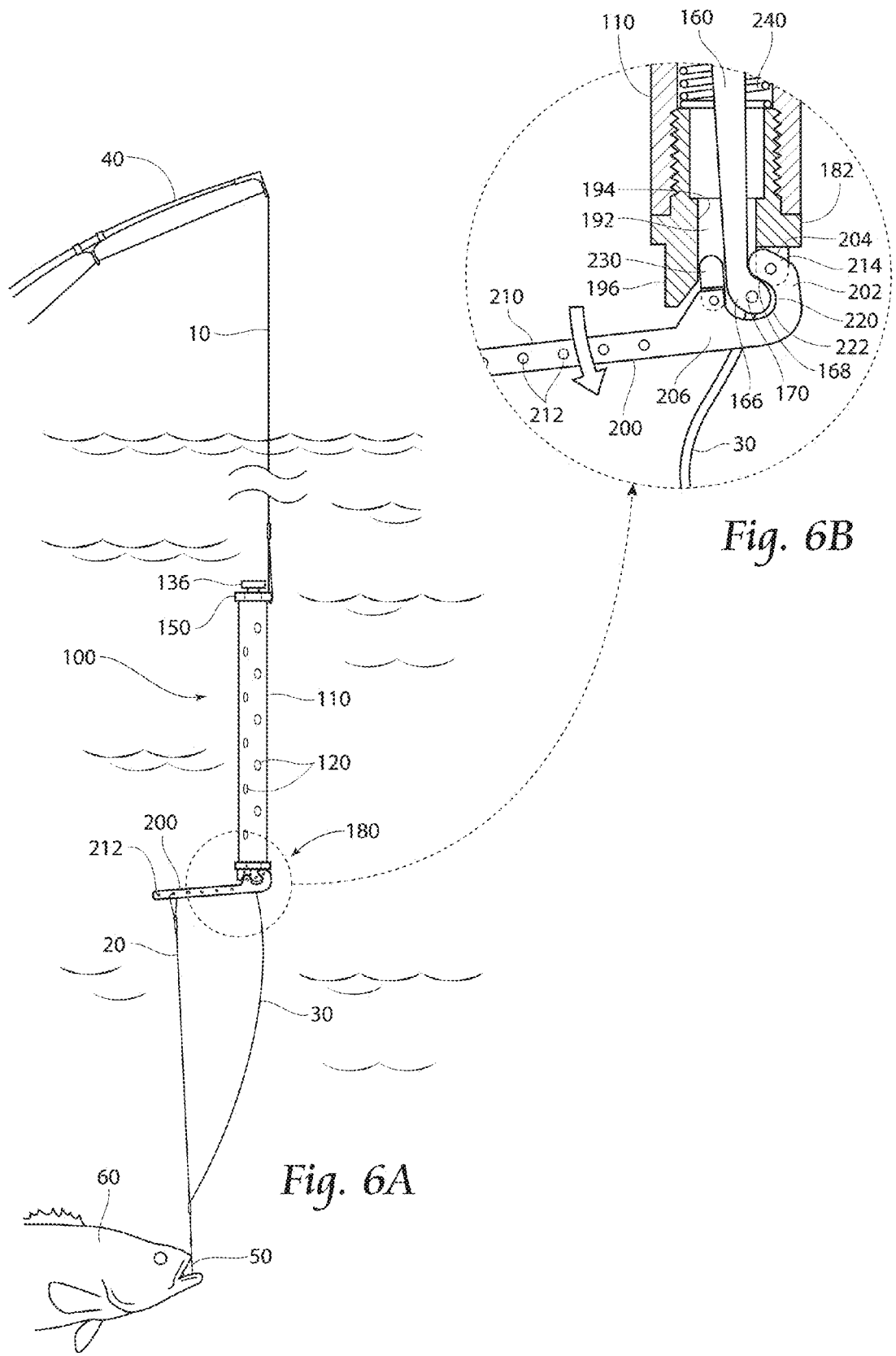

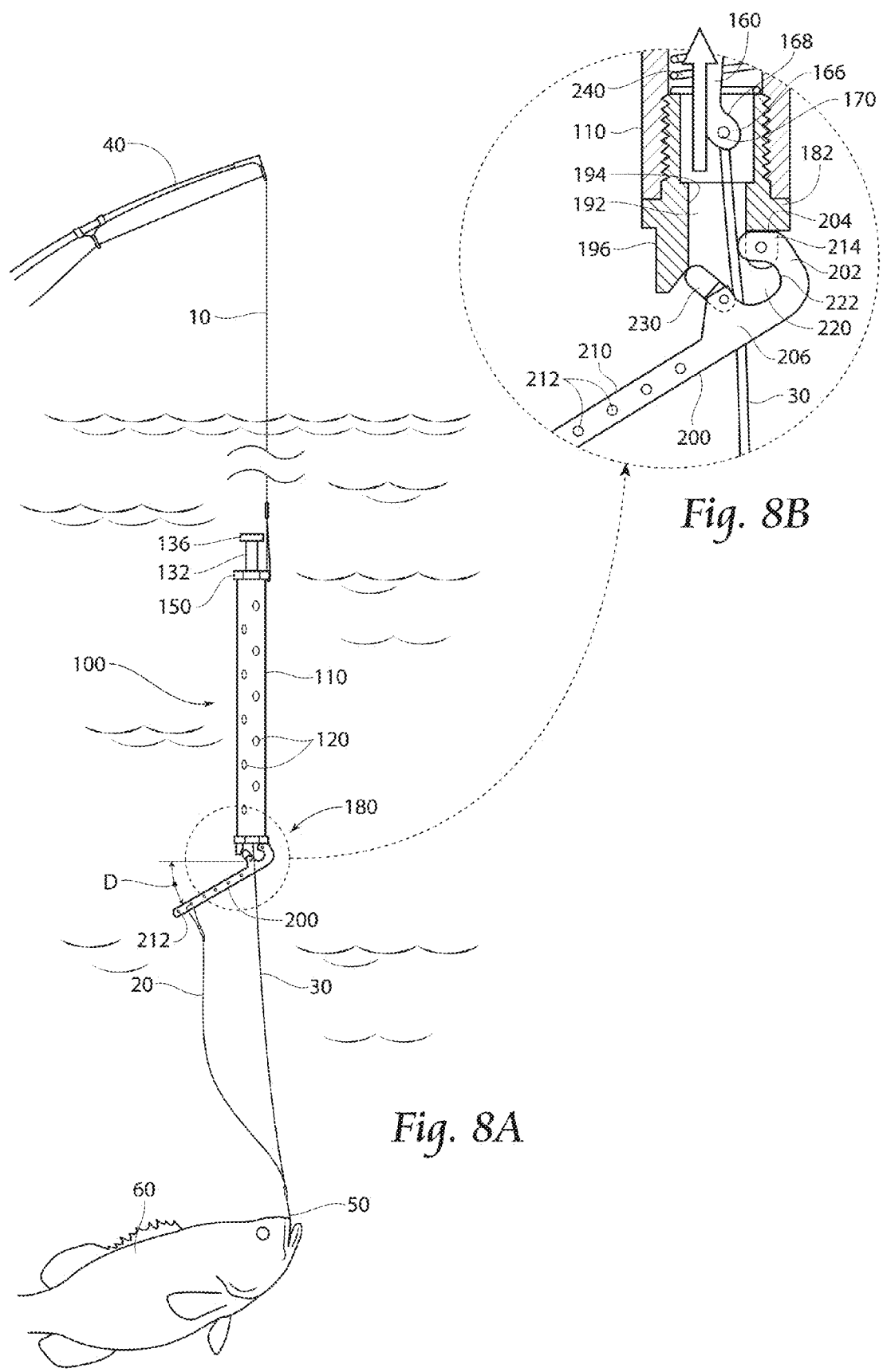

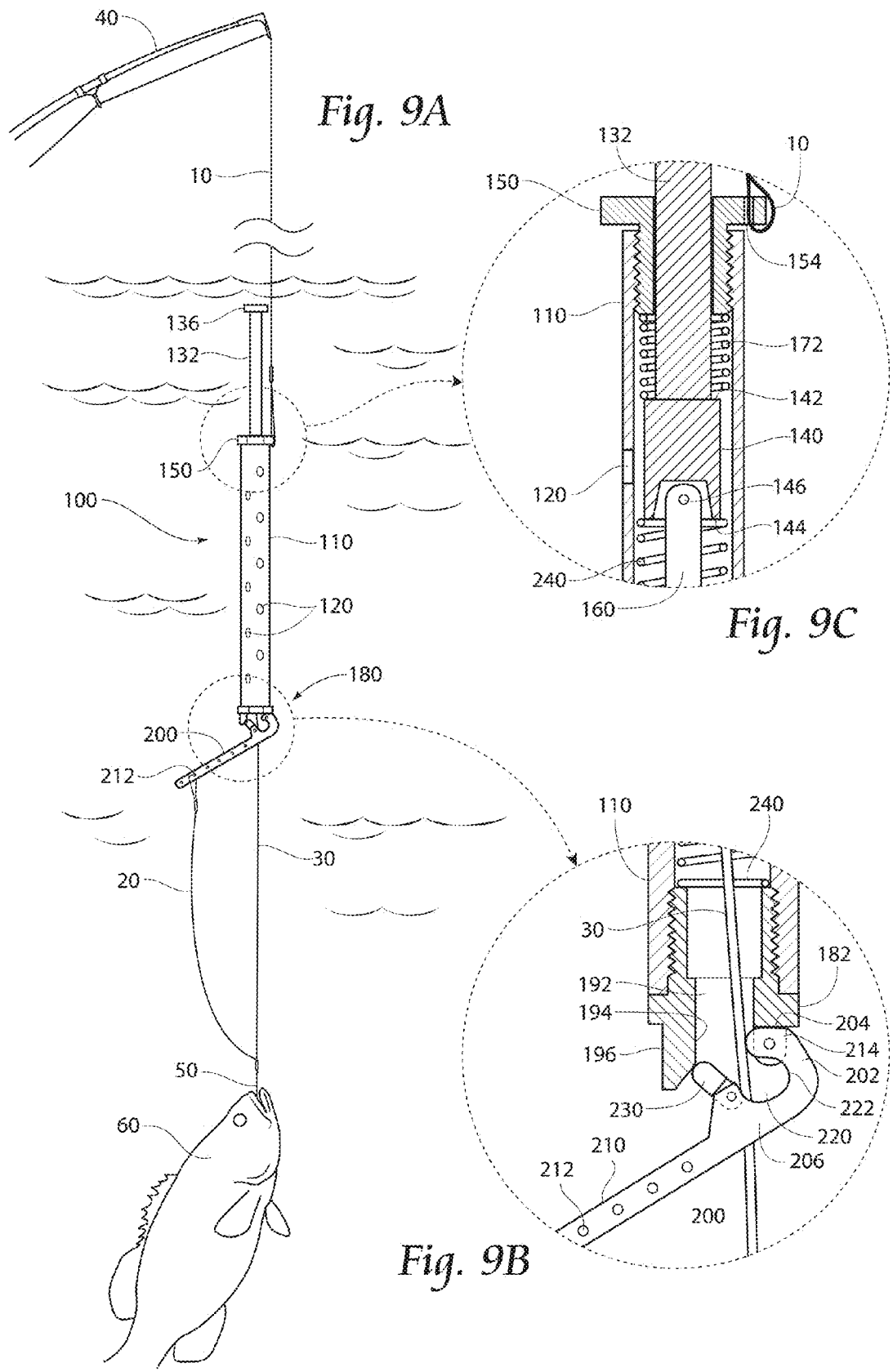

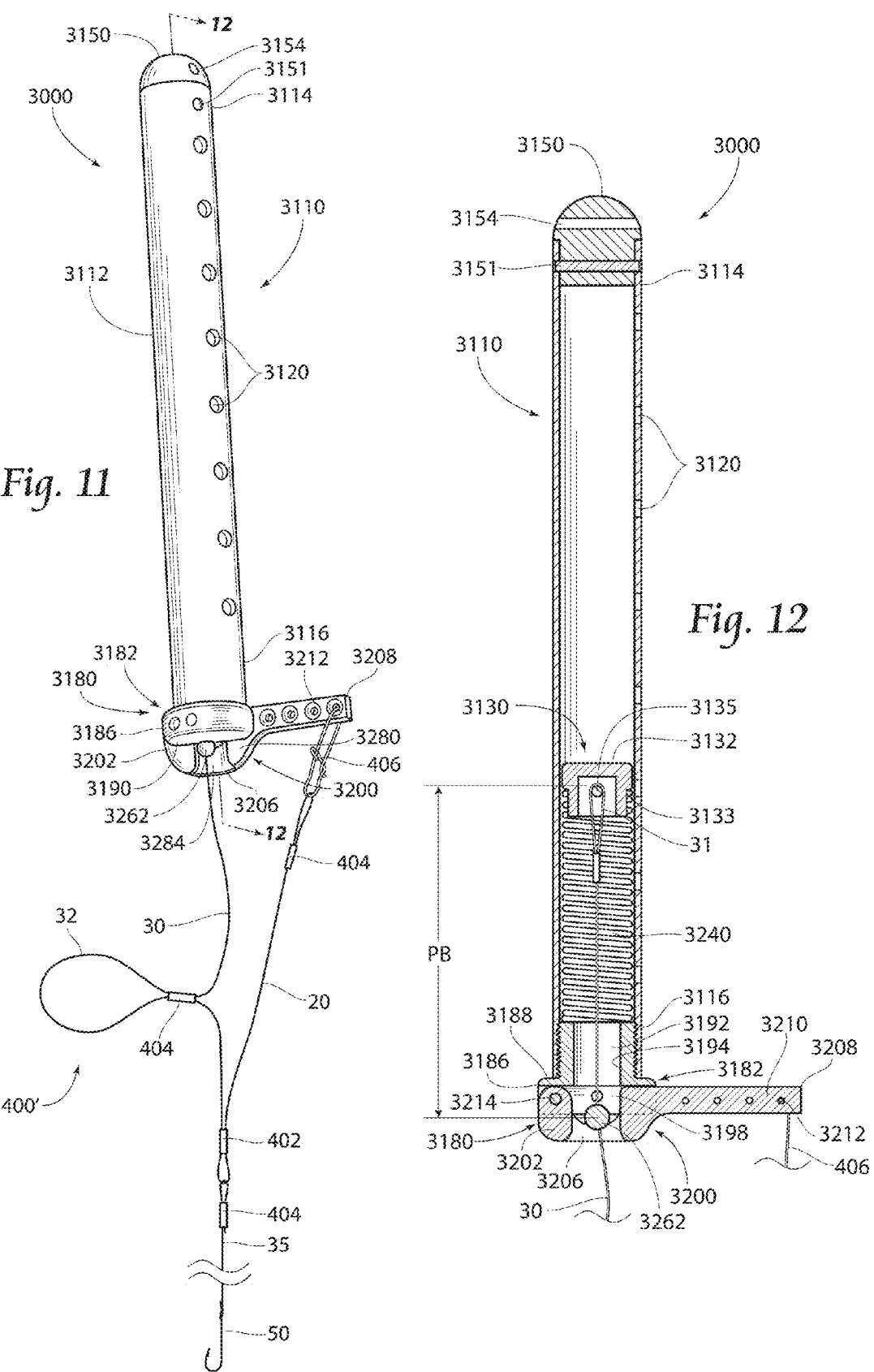

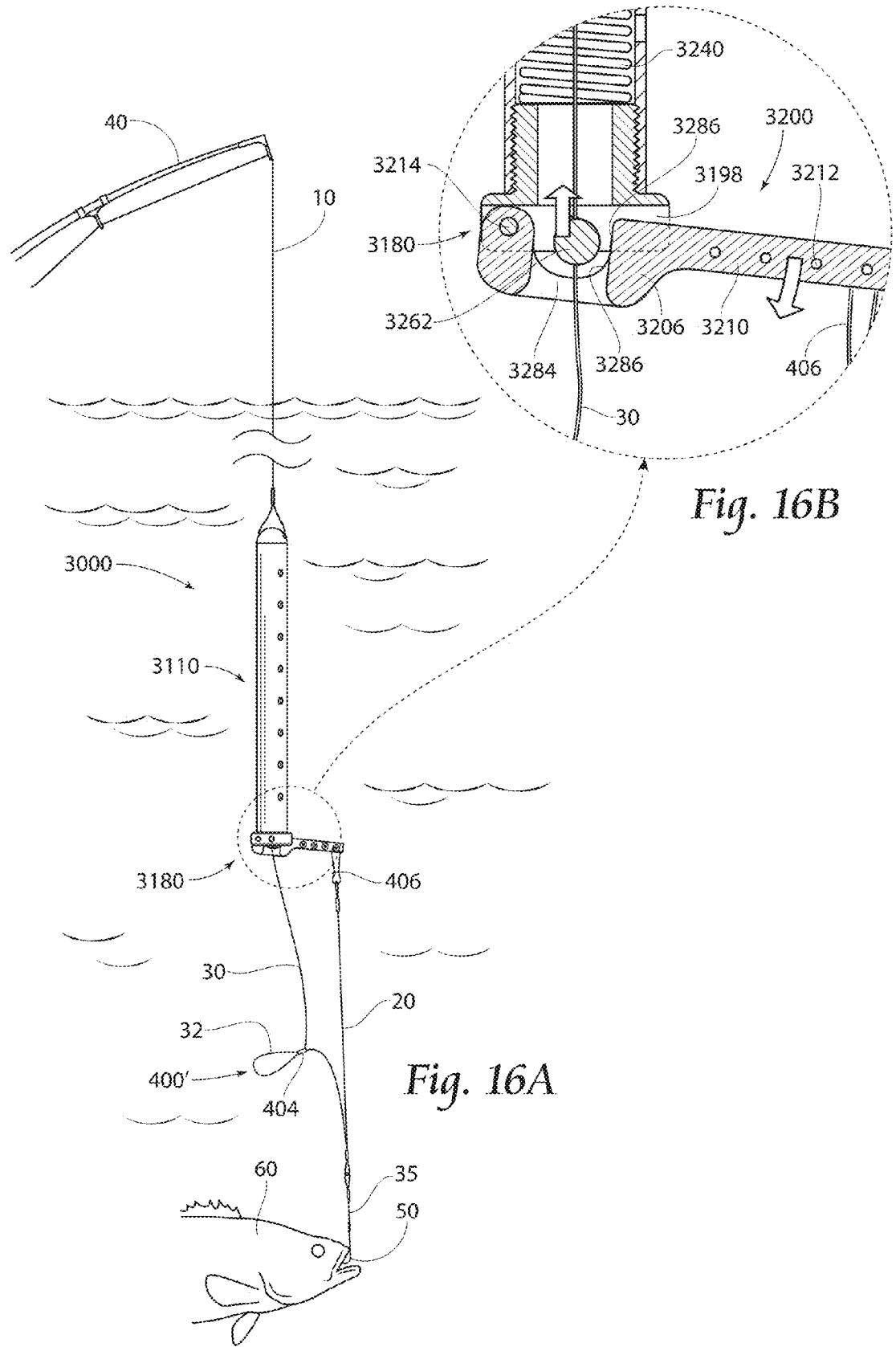

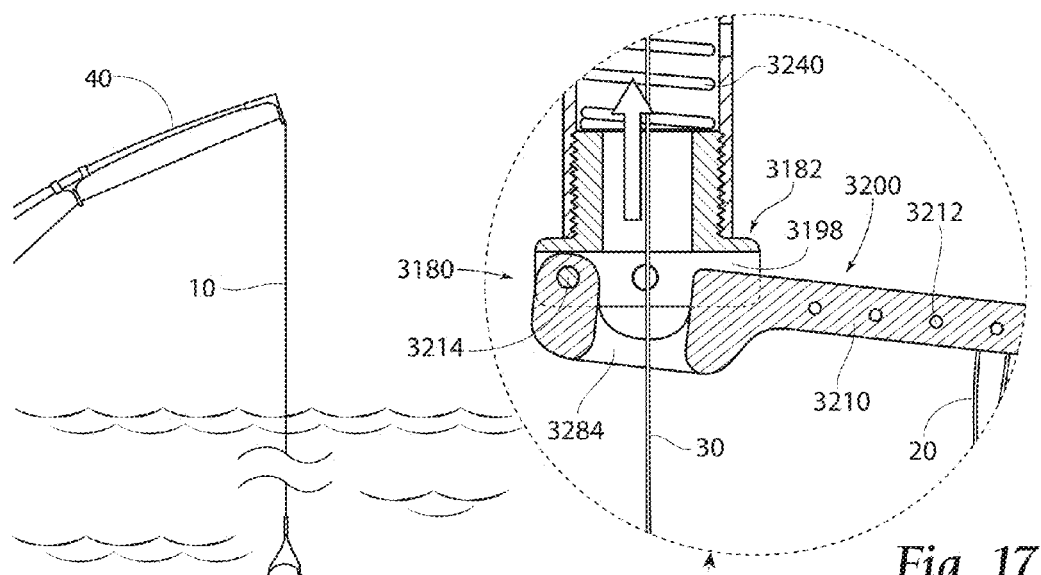
Fig. 17B
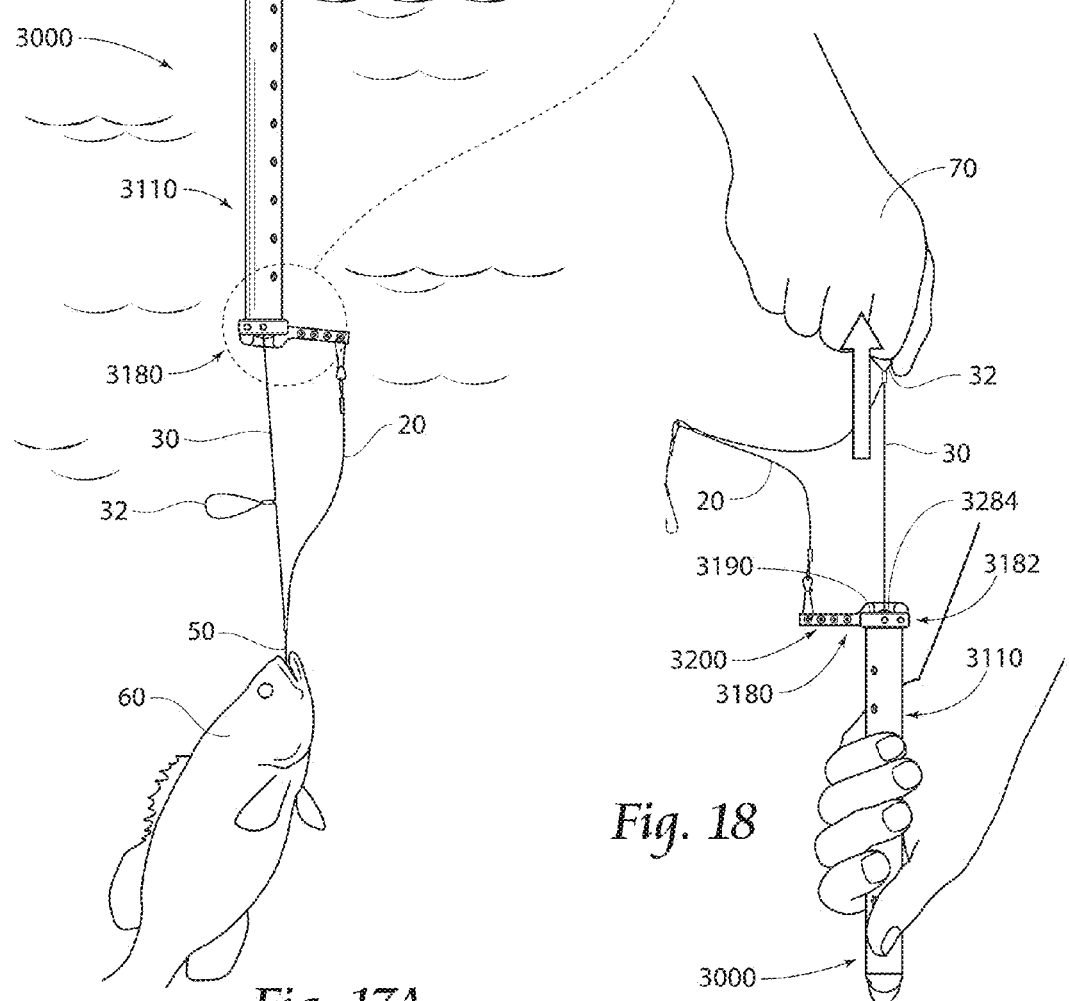
Fig. 17A
Fig. 18

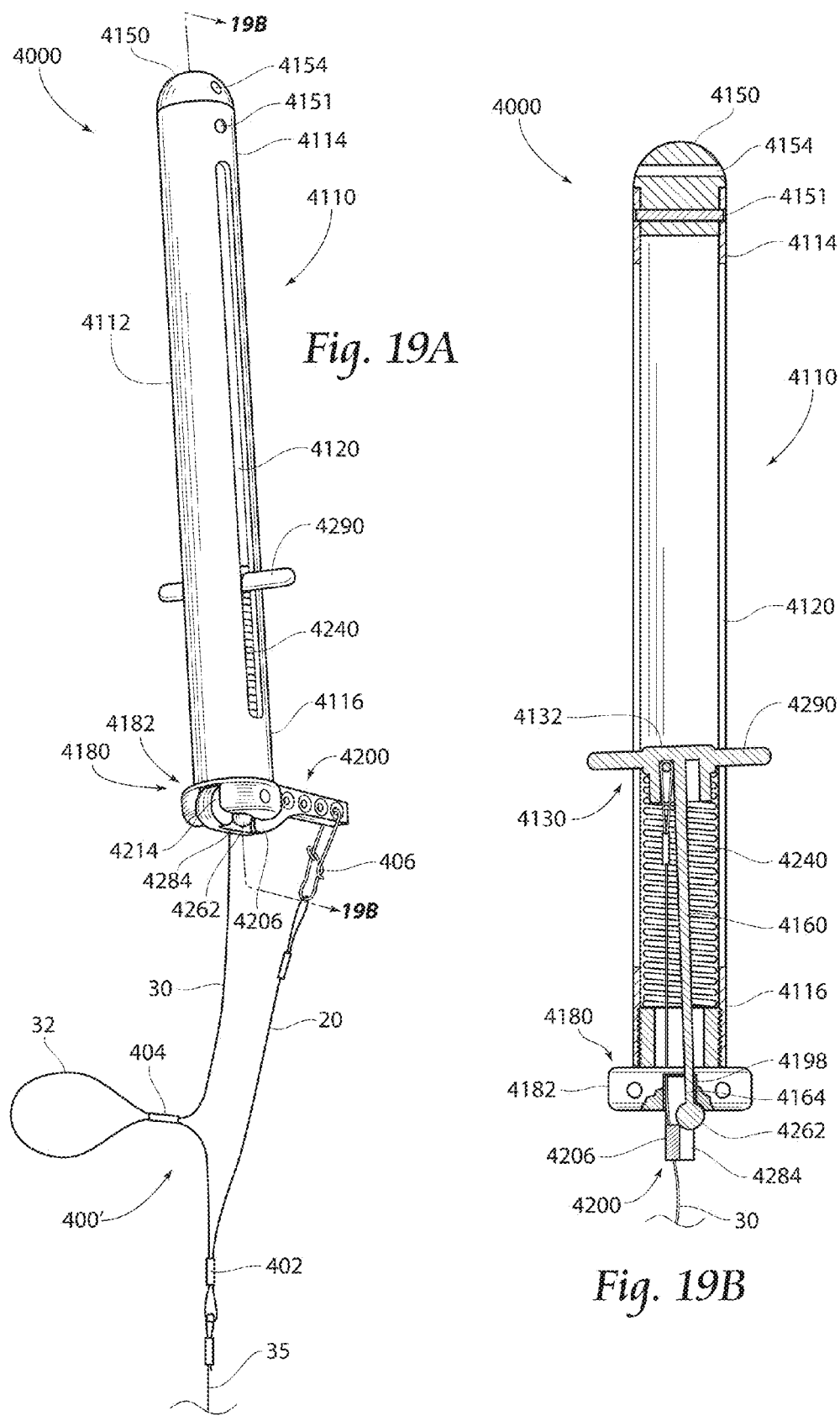

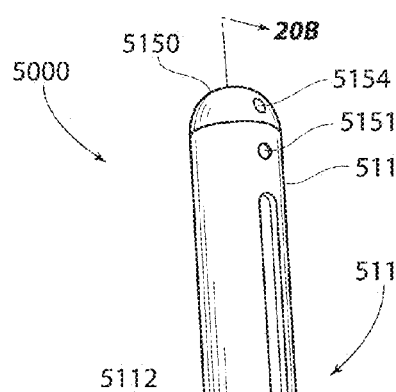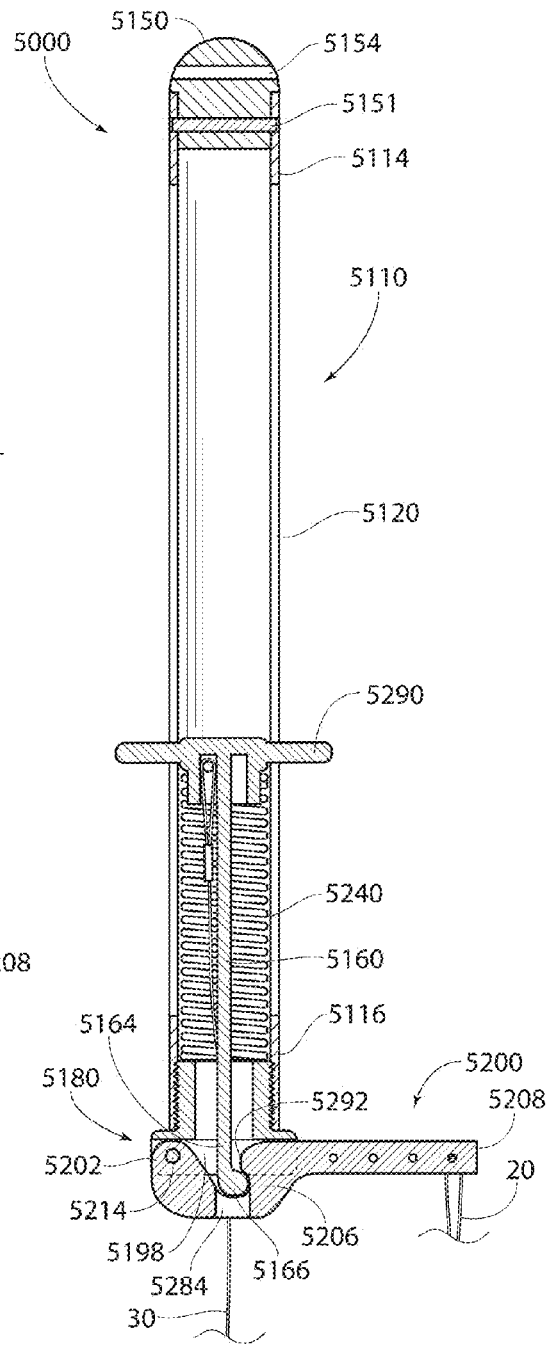
Fig. 20A
Fig. 20B

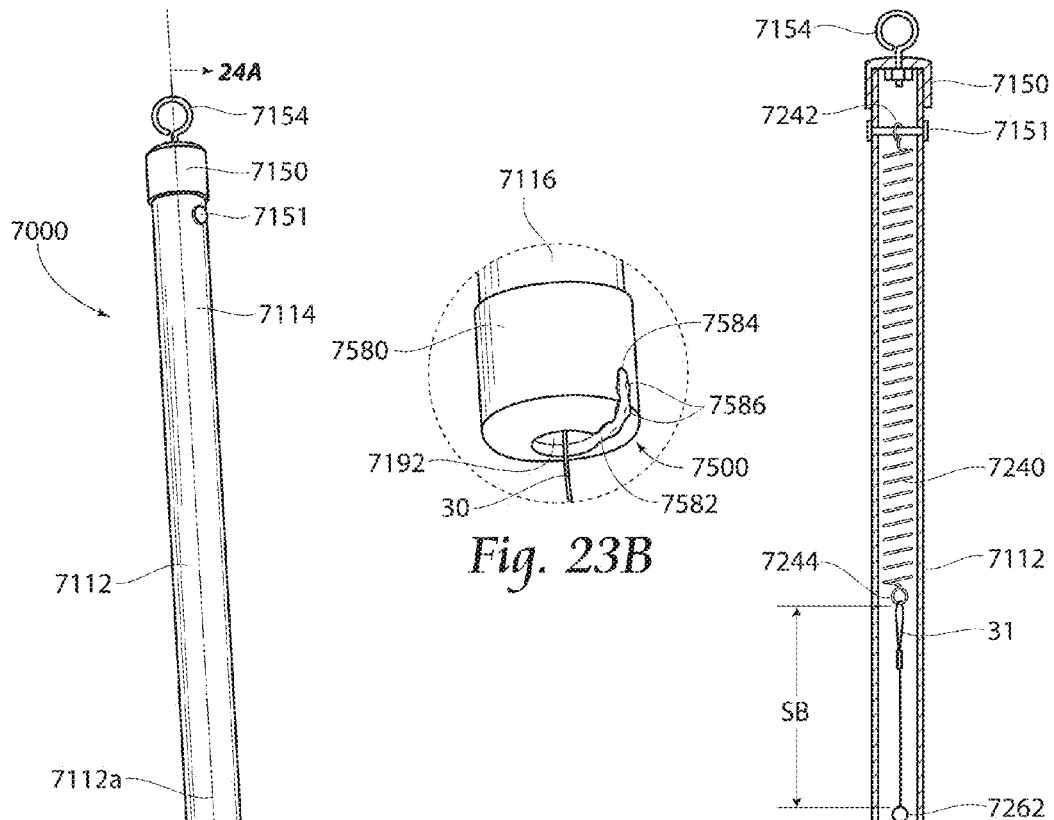
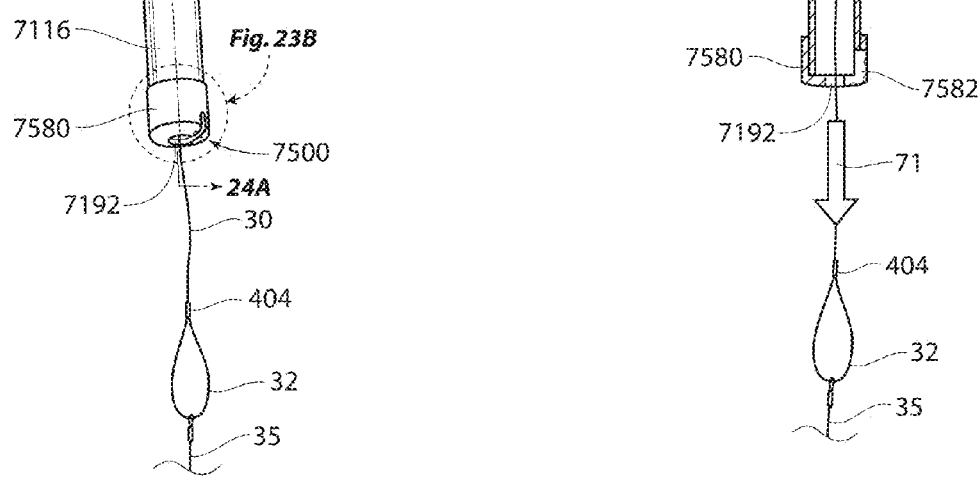

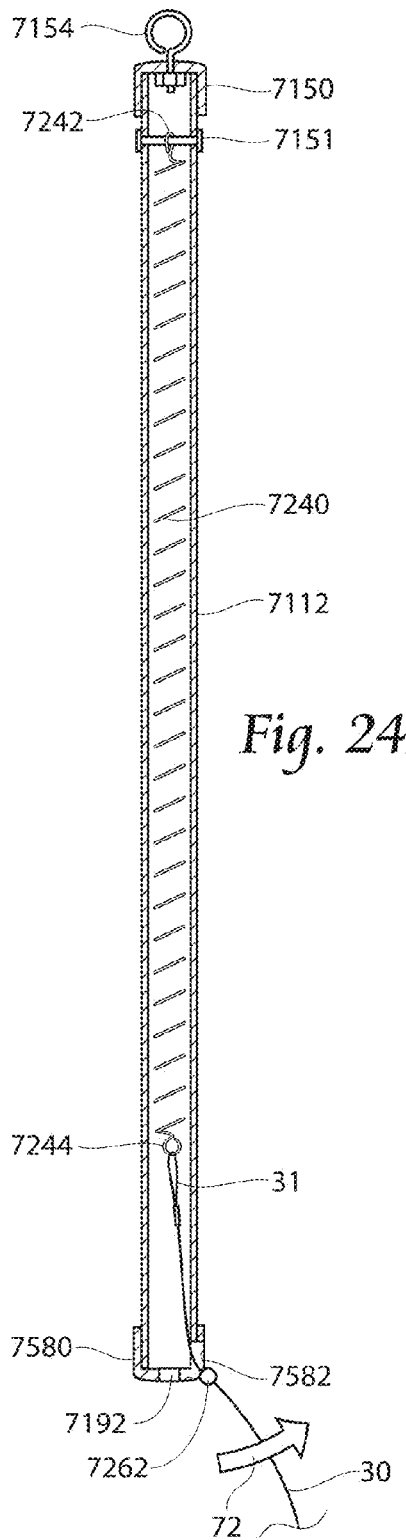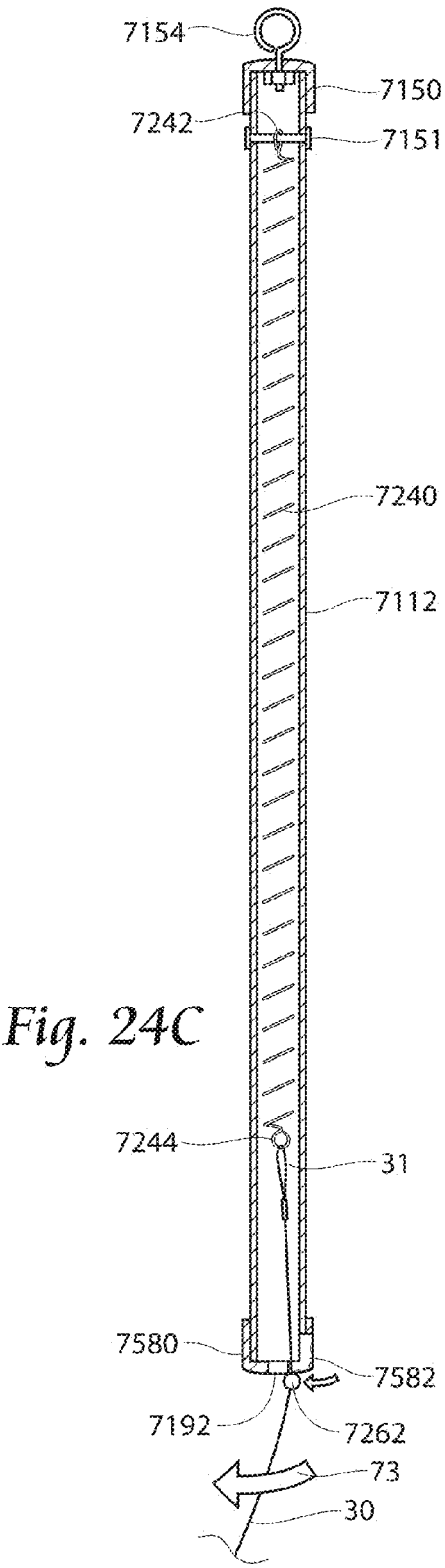

FISH HOOK SYSTEM

RELATED APPLICATIONS

This application claims the benefit of co-pending U.S. Provisional Patent Application Ser. No. 62/043,582, filed 29 Aug. 2014, and entitled "Fish Hook System," which is incorporated herein by reference in its entirety.

BACKGROUND OF THE INVENTION

Fishing is an activity predicated on patience and timing. When a fish snatches the bait offered on an unassuming hook or takes a bite of an attractive lure, the angler must be ready to set the fishing hook in the mouth of the fish to ensure the capture of the water faring beast, or else embrace the fate of being the losing party in another epic fishing saga. Setting a hook is generally accomplished by pulling back on the fishing rod in a quick jerking motion. If poorly timed, either too early or too late, the fish may escape as the hook has either not yet entered the fish's mouth or the fish has already taken the bait and swam away. Accordingly, anglers would benefit from a device capable of more consistently setting a hook in a fish's mouth at a more advantageous time.

SUMMARY OF THE INVENTION

The present invention relates to a hook setting device configured to set a hook in a fish's mouth with more consistency and with a greater rate of success. The present invention comprises an activation member assembly which, when triggered by a fish, will release a plunger assembly retained under pressure by a spring. The plunger assembly is attached to the fish hook via a line and when the plunger assembly is released it moves in a direction away from the fish and the hook is set in the fish's mouth.

An embodiment of a fish hook system according the present invention may include a sleeve extending between a sleeve proximal end portion and a sleeve distal end portion. A trigger lever may extend from and include a free end and a pivot end, the pivot end being pivotally coupled to the sleeve distal end portion. The trigger lever is preferably movable between a first position and a second position. A biasing member is included and preferably disposed within the sleeve. The biasing member may be a spring, such as an extension spring or a compression spring. A first line extends out of the sleeve distal end portion, the first line including and extending between a first line proximal end and first line distal end. The first line proximal end is preferably coupled to the biasing member and the first line distal end may be disposed outside of the sleeve, such as to be coupled to a fishing hook. A catch is also preferably affixed to the first line, wherein the catch engages at least the trigger lever in the first position, after the first line has been drawn out of the sleeve distal end portion against a biasing force of the biasing member. The catch may be a ball secured (e.g. adhered, welded, swaged) to the first line or a knot formed in the first line, for example. The catch can then maintain the device in a loaded or untriggered state until it is released. The catch releases from the trigger lever when the trigger lever is at a rotational position between the first position and the second position and at the second position. When the catch releases from the trigger lever, the biasing member causes the first line to be drawn at least partially into the sleeve.

According to yet another aspect of an embodiment of a fish hook system according to the present invention, such system may further include a second line extending between and including a proximal end and a distal end. The proximal end of the second line may be coupled to the trigger lever between the trigger lever pivot end and the trigger lever free end and the distal end of the second line may be coupled to the first line, such as at the first line distal end. A third line may extend between and include a proximal end and a distal end. The proximal end of the third line may be coupled to the distal end of the second line. In such embodiment, the hook may be coupled to the first line by being attached to the distal end of the third line. The trigger lever may thus be moved from the first position towards the second position by a force applied to the third line in a direction away from the distal end of the sleeve.

Another embodiment of a fish hook system according to the present invention may include a sleeve extending between a sleeve proximal end portion and a sleeve distal end portion. The sleeve distal end portion preferably includes a slot. A biasing member is included and preferably disposed within the sleeve. The biasing member may be a spring, such as an extension spring or a compression spring. A first line extends out of the sleeve distal end portion, the first line including and extending between a first line proximal end and first line distal end. The first line has a diameter that is preferably less than the width of the slot. The first line proximal end is preferably coupled to the biasing member and the first line distal end may be disposed outside of the sleeve, such as to be coupled to a fishing hook. A catch is also preferably affixed to the first line, wherein the catch is engageable with at least edges of the slot, after the first line has been drawn out of the sleeve distal end portion against a biasing force of the biasing member. The catch may be a ball secured (e.g. adhered, welded, swaged) to the first line or a knot formed in the first line, for example. The catch can then maintain the device in a loaded or untriggered state until it is released. The catch releases from the slot when the first line approaches a position that is coaxial with the longitudinal axis of the sleeve, and when the catch releases from the slot, the biasing member causes the first line to be drawn at least partially into the sleeve.

According to another aspect of an embodiment of a fish hook system according to the present invention, where the biasing member is an extension spring, it may be a double loop over center extension spring having a proximal loop and a distal loop. The first line may be secured directly the distal loop. The proximal loop may be coupled to the sleeve proximal end portion, such as by a pin extending through the sleeve and through the proximal loop.

BRIEF DESCRIPTION OF THE DRAWINGS

FIG. 1 is a perspective view of a first embodiment of a hook setting device according to the present invention.

FIG. 2 is a cut-away view along line 2-2 of the device of FIG. 1.

FIG. 3 is an exploded view of the hook setting device of FIG. 1. FIG. 4A is close-up partial cut-away view of the device shown in FIG. 1.

FIG. 4B is a close-up partial cut-away view of the device shown in FIG. 1.

FIGS. 6A and 6B are views of the device of FIG. 1 in a second state.

FIGS. 8A and 8B are views of the device of FIG. 1 in a fourth state.

FIGS. 9A-9C are views of the device of FIG. 1 in a fifth state.

FIG. 11 is a perspective view of a third embodiment of a hook setting device according to the present invention.

FIG. 12 is a cross-sectional view along line 12-12 of the device in FIG. 11.

FIGS. 16A and 16B are views of the hook setting device of FIG. 11 in a second state.

FIGS. 17A and 17B are views of the hook setting device of FIG. 11 in a third state.

FIG. 18 is a side view of the hook setting device of FIG. 11 held in a user's hands.

FIG. 19A is a perspective view of a fourth embodiment of a hook setting device according to the present invention.

FIG. 19B is a cut-away view along line 19B-19B of the device in FIG. 19A.

FIG. 20A is a perspective view of a fifth embodiment of a hook setting device according to the present invention.

FIG. 20B is a cut-away view along line 20B-20B of the device in FIG. 20A.

FIG. 23A is a perspective view of a seventh embodiment of a fish hook system according to the present invention.

FIG. 23B is a close-up perspective view of a portion of the embodiment of FIG. 23A.

FIGS. 24A-D are cross-sectional views taken along line 24A-24A of FIG. 23A.

DESCRIPTION OF THE PREFERRED EMBODIMENT

Figures 5A, 5B:
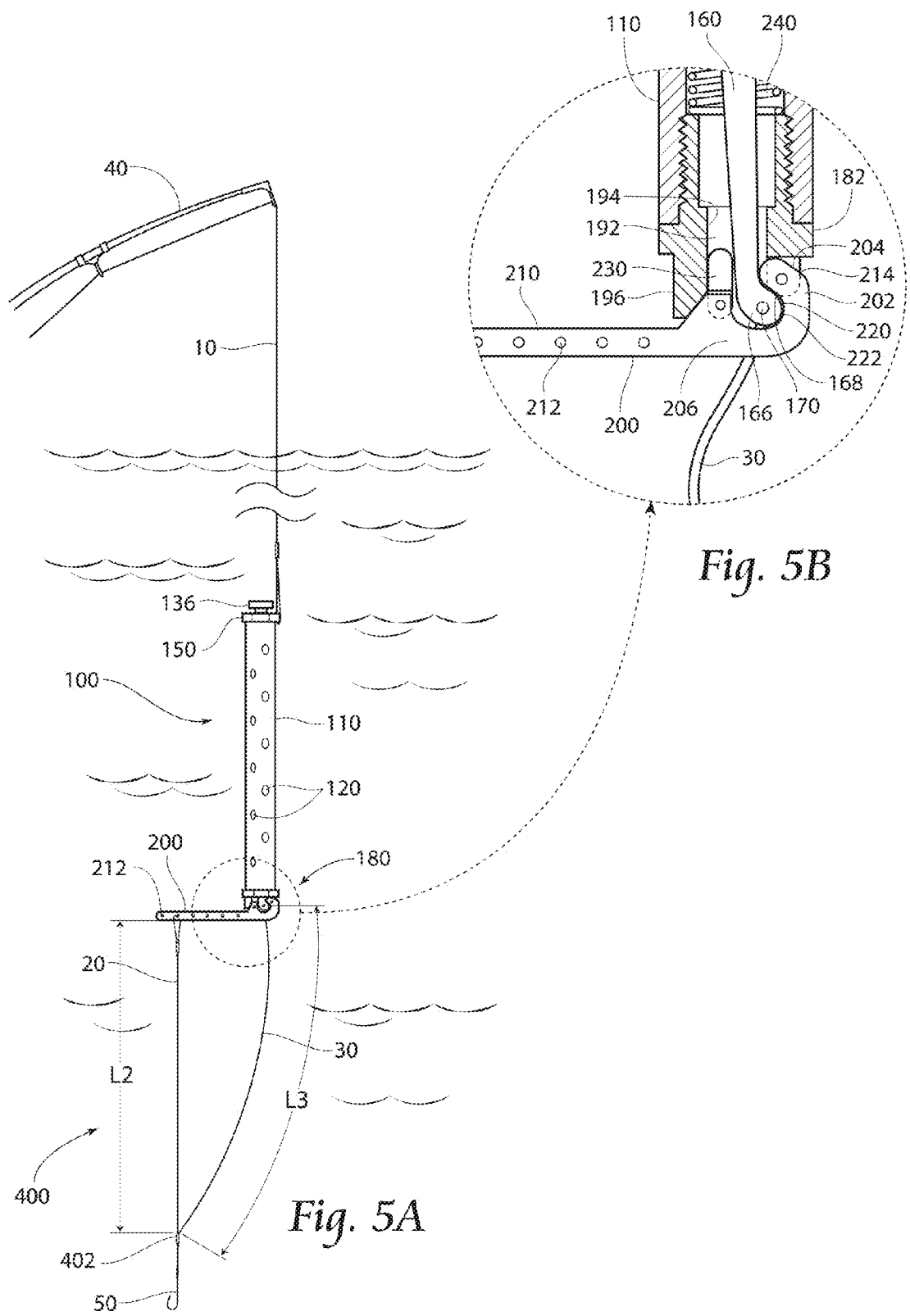
FIGS. 5A and 5B are views of the device of FIG. 1 in a first state.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

A first embodiment 100 of a hook setting device is shown in FIG. 1. The hook setting device 100 comprises a sleeve 110, a plunger assembly 130 (see FIG. 2), an activation member assembly 180, and a biasing member 240 (see also FIG. 2).

The sleeve 110 preferably comprises a tubular pipe 112 with a plurality of sleeve apertures 120. The pipe 112 has a pipe first end portion 114 and a pipe second end portion 116 opposite the pipe first end portion 114. The sleeve apertures 120 decrease the overall weight of the pipe 112 and allow fluid that may have entered the hook setting device 100 when submerged to exit upon activation of the hook setting device 100. The sleeve apertures 120 also allow air that may be trapped within the hook setting device 100 when submerged, potentially making the hook setting device 100 buoyant, to exit the hook setting device 100. The sleeve apertures 120 may take any shape including, but not limited to, circles and/or slots.

Turning now to FIGS. 2 and 3 in which the hook setting device 100 is shown in greater detail. FIG. 2 is a cut-away view of the hook setting device 100 according to the present invention and illustrates the otherwise interrelationships of the sleeve 110, the plunger assembly 130, and the activation member assembly 180. FIG. 3 illustrates an exploded view of the hook setting device 100 to better illustrate the specific elements of the hook setting device 100.

The partial cut-away view of the sleeve 110 in FIG. 3 illustrates pipe internal threads 118 extending inward from both the pipe first end portion 114 and the pipe second end portion 116.

The activation member assembly 180 comprises a base 182, a finger 200, a knuckle 214, a pocket 220 defining a pocket surface 222, and a stopper 230. The base 182 comprises base external threads 184, a base collar 186 having an inwardly facing surface 188 and an outwardly facing surface 190, a base bore 192 defining a base bore surface 194 (see FIG. 5B), and a cantilever 196. The base external threads 184 interface with the pipe internal threads 118 of the pipe second end portion 116.

The finger 200 preferably comprises a finger proximal end portion 202, a finger medial portion 206, and a finger distal end portion 208. The finger proximal end portion 202 is rotatably attached to the base 182 at the knuckle 214. The stopper 230 is rotatably attached to the finger medial portion 206 and may extend into the base bore 192 and positioned alongside the cantilever 196. The finger 200 extends from the finger medial portion 206 to the finger distal end portion 208 forming a finger lever 210. The finger lever 210 preferably comprises a plurality of holes 212.

The plunger assembly 130 as shown here preferably comprises a rod 132, a fitting 150, and an arm 160. The rod 132 has a rod first end portion 134 with a rod first end portion collar 136 and a rod second end portion 138 with a rod second end portion collar 140. The rod second end portion collar 140 has a rod second end portion collar first surface 142 and a rod second end portion collar second surface 144. The arm 160 comprises an arm proximal end portion 162 and an arm distal end portion 164. The arm proximal end portion 162 is pivotally attached to the rod second end portion 138. Shown here, the arm proximal end portion 162 is pivotally affixed to the rod second end portion collar second surface 144 by pin 146. The arm distal end portion 164 terminates in an offset bulb 166. The offset bulb 166 comprises a catch surface 168 and a bulb aperture 170 extending through the offset bulb 166.

The fitting 150 comprises a fitting collar 152 with a collar through-hole 154, fitting external threads 156 and a fitting bore 158. The rod 132 is positioned through the fitting bore 158 and the fitting external threads 156 interface with the pipe internal threads 118 of the pipe first end portion 114.

Additionally or alternatively, a dampener 172, shown here as a coil spring, may be included between the fitting 150 and the rod second end portion collar first surface 142.

FIG. 4A shows the hook setting device 100 in an engaged state with the offset bulb 166 of the arm 160 within the pocket 220 of the activation member assembly 180. In the engaged state, the offset bulb 166 of the arm 160 is positioned within the pocket 220 and the stopper 230 is between the arm 160 and the base bore surface 194.

Figures 7A, 7B:
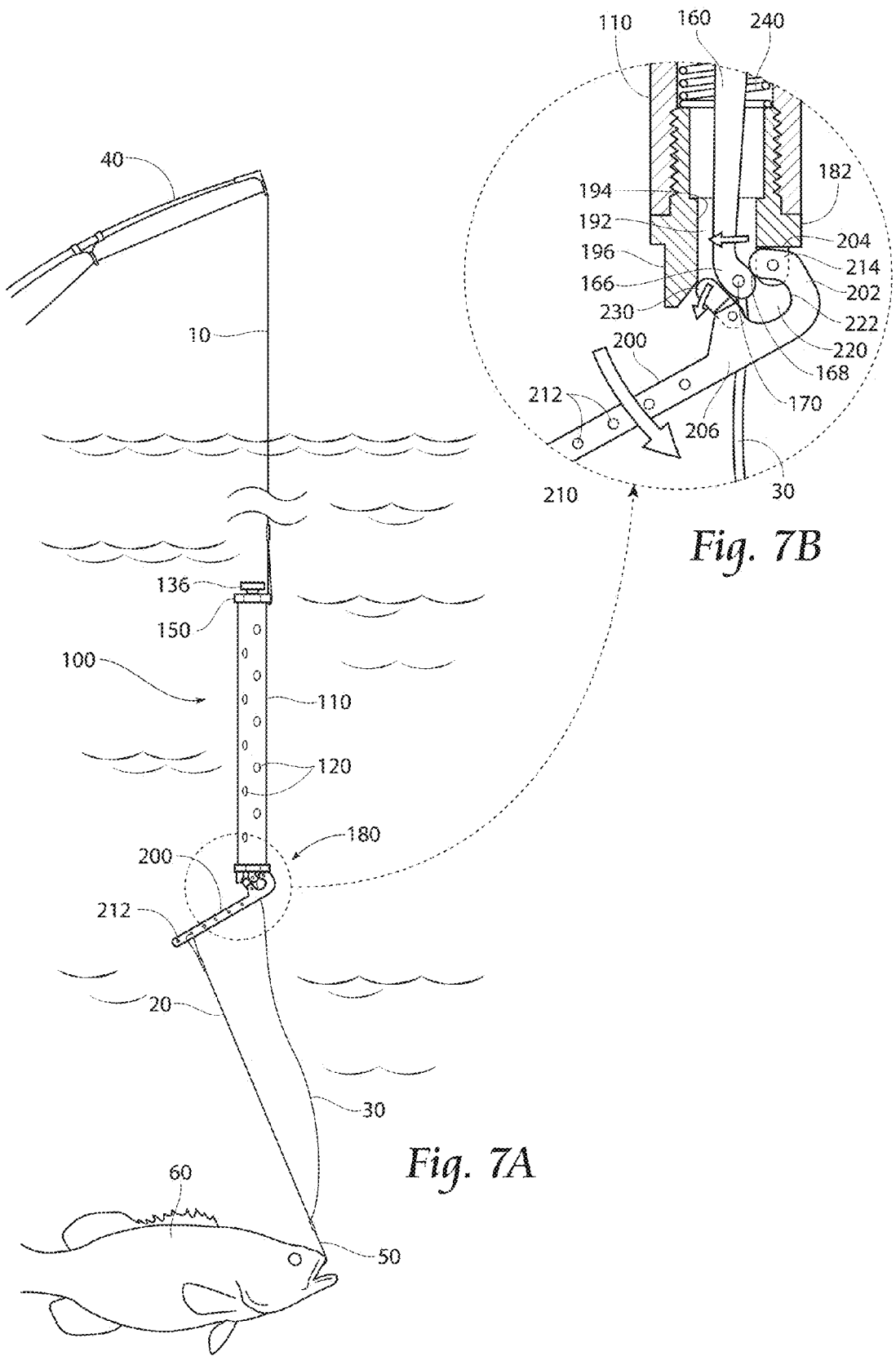
FIGS. 7A and 7B are views of the device of FIG. 1 in a third state.

To place the hook setting device 100 into the engaged state, the finger lever 210 is rotated away from the sleeve 110, thus removing the stopper 230 from the base bore 192 (see FIG. 7B). Preferably, the periphery 204 of the finger proximal end portion 202 is shaped to provide an interference between the finger proximal end portion 202 and the outwardly facing surface 190 of the base collar 186, thus limiting rotation of the finger 200 past a predetermined angle and preferably before the stopper 230 travels completely beyond the cantilever 196.

The bulb 166 of the arm 160 may then be passed through the base bore 192 and into the pocket 220. The biasing member 240 is compressed during this transition as it is located between the base 182 and the rod second end portion collar second surface 144, thus inducing a compression spring force opposing the movement of the rod second end portion collar 140 towards the second end portion 116 of the pipe 112. In order to retain the bulb 166 within the pocket 220, the finger lever 210 is rotated back towards the sleeve 110 and the stopper 230 guides the arm 160 into a position in which the catch surface 168 of the bulb 166 abuts the pocket surface 222. Thus, the stopper 230 forces the arm 160 to interface the pocket surface 222 and the catch surface 168 to prevent the arm 160 from movement encouraged by the compressed biasing member 240.

FIG. 4B further illustrates the knuckle 214 and the cantilever as viewed from above the orientation of the hook setting device 100 in FIG. 4A.

FIGS. 5A-9B illustrate the operation of the hook setting device 100 according to the present invention. FIGS. 5A and 5B show the hook setting device 100 in the engaged position as described earlier with respect to FIGS. 4A and 4B. It can be seen that the offset bulb 166 is positioned within the pocket 220 and the stopper 230 is between the arm 160 and the base bore surface 194.

As shown in FIG. 5A, a first fishing line 10 extends from a fishing pole 40 to the pipe first end portion 114, on which the first fishing line 10 is secured through the collar through-hole 154. A first trigger rig 400 includes a second fishing line, or leader, 20 and a third fishing line, or leader 30. The second fishing line, or leader, 20 has a length L2 between the selected lever hole 212 and a connection point 402 of the second fishing line 20 and the third fishing line 30. The third fishing line, or leader, 30 has a length L3 and is secured to the bulb aperture 170 and is tied in with the second fishing line 20, or lure 50, in a manner known to one skilled in the art, at the connection point 402. It should be noted that the first fishing line 10 may be attached to a BEAVER DAM TIP-UP® or any other fishing device (or even a relatively stationary device, such as a tree limb, deck railing, or buoy), and the hook 50 may be of any type including, but not limited to, an EAGLE CLAW® hook and NORTHLAND FISHING TACKLE® jigging lures.

It is preferred that the third fishing line 30 have a minimum length L3 that is longer than the sum of the length L2 of the second fishing line 20 and the largest finger lever distance D traveled by the finger lever 210 (see FIG. 8A) at the moment of activation of the hook setting device 100. The second line 20 and the third line 30 may include any suitable material, including monofilament, fused lines, braided lines, etc., but a preferred second line 20 and third line 30 comprise braided stainless steel cable of a predetermined diameter, such as about 3/64 or 1/16 of an inch. An exemplary cable 20,30 is a stainless steel 7x7 wire rope of such dimensions.

It is also preferred that the third fishing line 30 have a maximum length L3 that is less than the sum of the length of the largest finger lever distance D traveled by the finger lever (see FIG. 8A) at the moment of activation of the hook setting device 100, the second fishing line length L2, and the distance L (see FIG. 2) between the fitting 150 and the rod second end portion collar first surface 142 when the hook setting device 100 is in the engaged state. More preferably, the length L3 may be adjusted and fixed to any length between the indicated minimum and maximum lengths. The closer the length L3 is to the minimum, the quicker the hook set time, namely the time from the trigger rig 400 being tripped, the bulb 166 being released from the pocket 220 and hook 50 being jerked upwardly by the third line 30.

In FIGS. 6A and 6B, a fish 60 approaches and bites the hook 50. The second fishing line 20 is pulled tight as the finger lever 210 rotates about the knuckle 214. The plurality of lever holes 212 allow an angler to set the amount of force needed for a fish 60 to release the plunger assembly 130. If less force is preferred, the angler may attach the second fishing line 20 in one of the plurality of lever holes 212 farther away from the knuckle 214. If more force is preferred, the angler may attach the second fishing line 20 in one of the plurality of lever holes 212 closer to the knuckle 214.

Looking now to FIGS. 7A and 7B, the fish 60 has rotated the finger lever 210 farther thus pulling the stopper 230 out of the base bore 192 and allowing the offset bulb 166 to exit the pocket 220.

In FIGS. 8A and 8B, the offset bulb 166 is completely out of the pocket 220 and the spring force induced by the compressed biasing member 240 is released, pulling the third fishing line 30 tight and setting the hook 50 in the fish 60.

As shown in FIGS. 9A-9C, the rod 132 travels through the sleeve 110 until the rod second end portion collar first surface 142 makes contact with the fitting 150 or dampener 172. In the embodiment shown, a dampener 172 is employed as alternatively described above with respect to FIGS. 2 and 3, allowing the rod 132 to be brought to a stop in a more controlled fashion.

It is further contemplated by the present invention that the hook setting device 100 may comprise different sizes for various size fish 60.

Figure 10A:
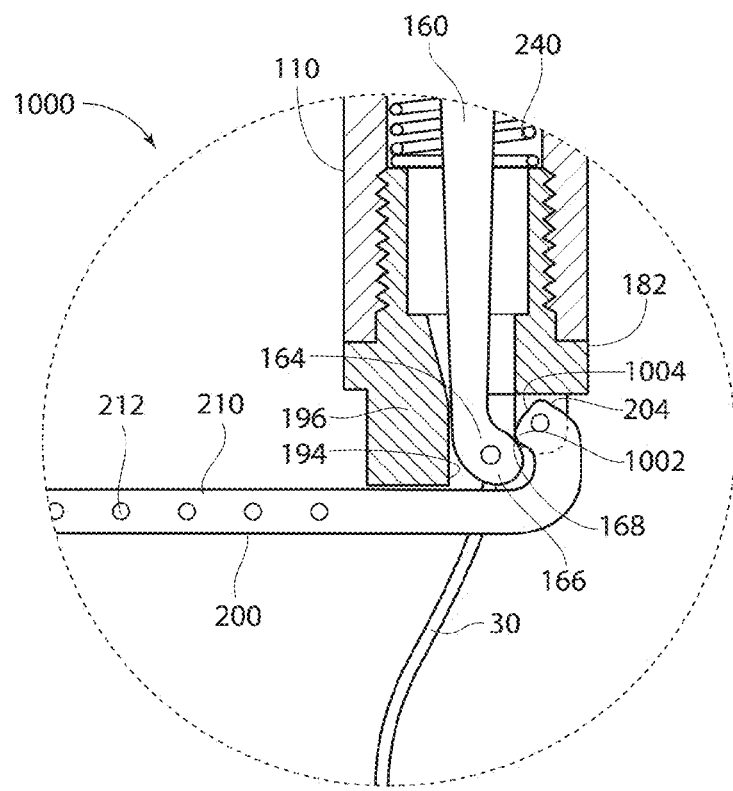
FIG. 10A is a first partial cut-away view of a second embodiment of a hook setting device according to the present invention.
Figure 10B:
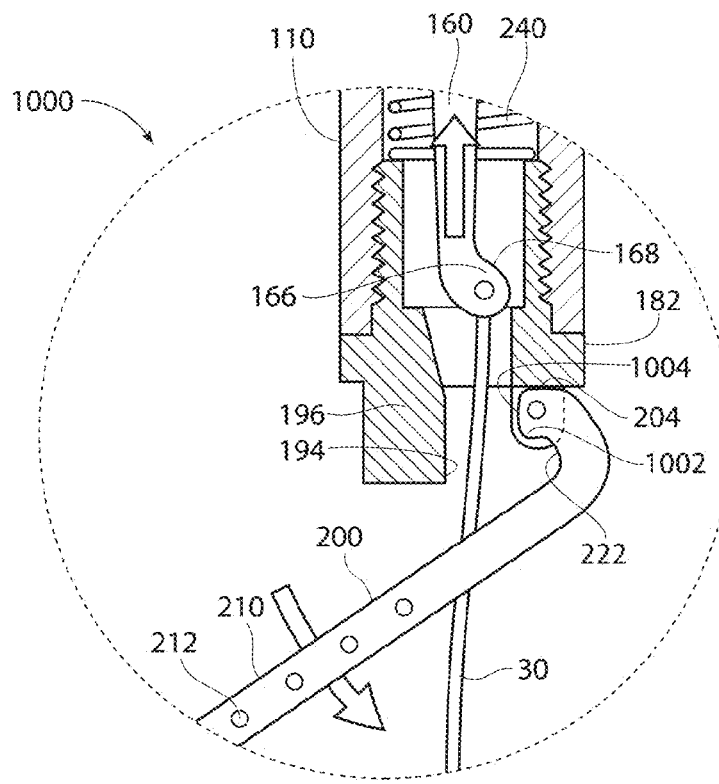
FIG. 10B is a second partial cut-away view of the second embodiment.
Figure 13:
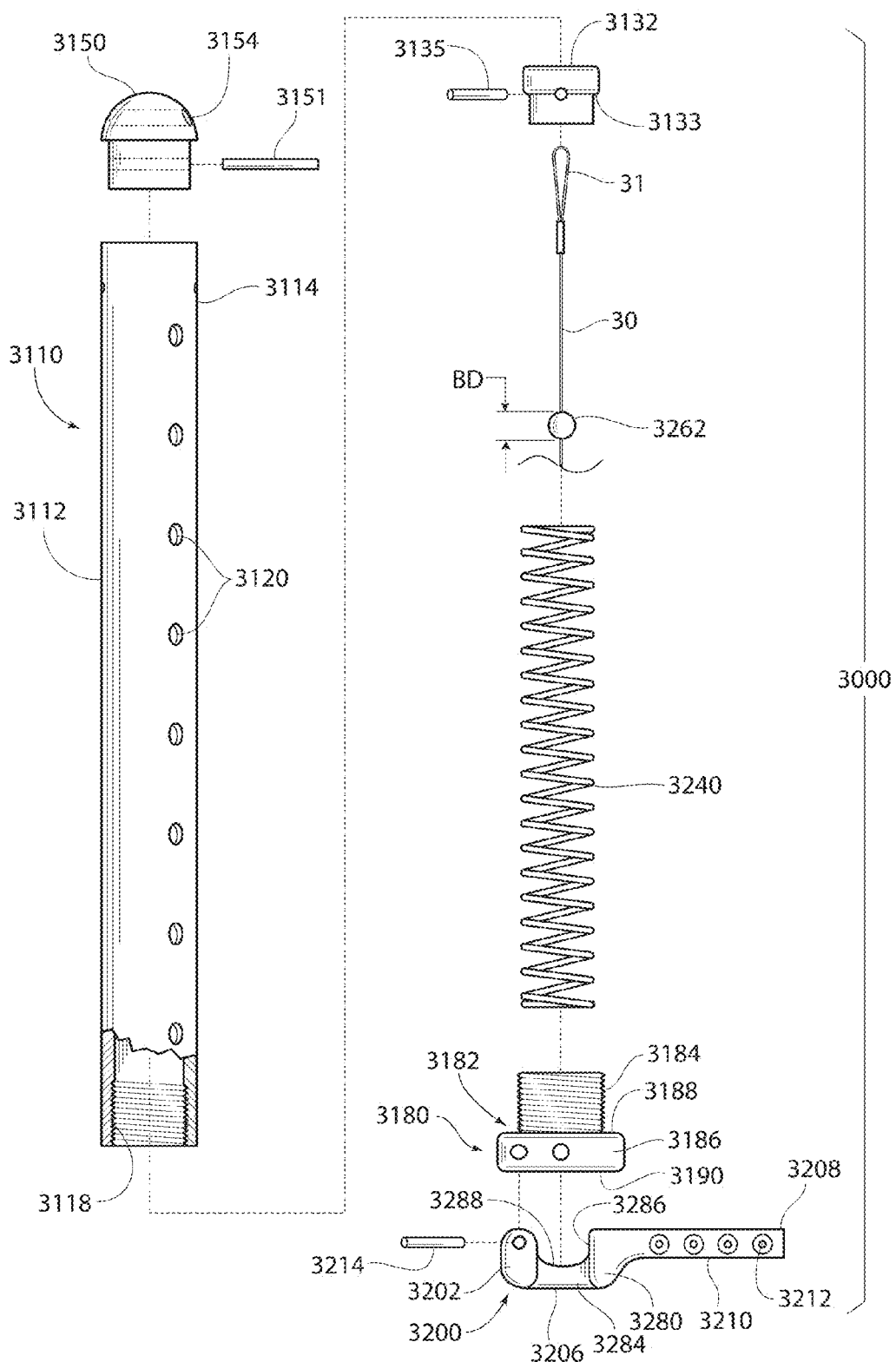
FIG. 13 is an exploded view of the hook setting device shown in FIG. 11.

FIGS. 10A and 10B illustrate a second embodiment 1000 of the hook setting device. It should be noted that like part numbers represent like parts among the various embodiments. As shown here, the arm distal end portion 164 abuts the cantilever 196 and the offset bulb catch surface 168 is in contact with the pocket surface 222. The finger proximal end portion periphery 204 has a lobe-like profile 1002 with a flat spot 1004. According to this embodiment, when a fish 60 (as shown in FIG. 6A) triggers the hook setting device 1000, the finger 200 rotates relative to the arm offset bulb 166, and due to the lobe-like profile 1002 of the proximal end portion periphery 204, the flat spot 1004 will rotate to a position substantially alongside the offset bulb 166, thus releasing the arm 160. As the arm 160 would not necessarily need to pivot out of the pocket 220 according to this embodiment, the rod 132 and the arm 160 may be formed from one piece of material.

A third embodiment 3000 of the hook setting device is shown in FIGS. 11-18. First looking to FIGS. 11-13, it can be seen that the third embodiment 3000 is similar to the first embodiment 100 of the hook setting device in that the third embodiment 3000 comprises a sleeve 3110, a plunger assembly 3130 (see FIG. 12), an activation member assembly 3180, and a biasing member 3240 (see also FIG. 12).

The sleeve 3110 preferably comprises a tubular pipe 3112 with a plurality of sleeve apertures 3120. The pipe 3112 has a pipe first end portion 3114 and a pipe second end portion 3116 opposite the pipe first end portion 3114. The pipe first end portion 3114 is preferably closed by a cap 3150. The cap 3150 may be received within the pipe first end portion 3114, and secured thereto with a cap pin 3151. The cap 3150 further preferably includes a through-hole 3154, adapted to receive a first fishing line 10 or other support line or structure. The pipe second end portion 3116 has internal threads 3118. The sleeve apertures 3120 may take any shape including, but not limited to, circles and/or slots.

The plunger assembly 3130 comprises a puck 3132 with a biasing surface 3133 and a catch (such as a knot in the line 30 or a ball 3262 with a ball diameter BD). The puck 3132 resides within the sleeve 3110 and is configured to translate along the tubular pipe 3112. A third fishing line 30 is affixed to the puck 3132 on one end (such as with a loop 31 extending around a puck pin 3135 secured to the puck 3132) and extends out of the second end portion 3116 of the sleeve 3110. The ball 3262 acts as a catch and is secured to the third fishing line 30 at a predetermined distance PB from the biasing surface 3133. The ball 3262 may be secured to the line by any suitable means, such as adhesive, welding, etc., but the ball 3262 is preferably a stainless steel ball that is swaged onto the line 30. The distance PB between the puck 3132 and the ball 3262 determines the amount of potential energy stored in the biasing member 3240 when in the engaged position (as will be explained in further detail below). A preferred biasing member 3240 comprises a compression spring having a free length, an outside diameter, a wire gauge or thickness, and a predetermined number of coils. A preferred nominal spring free length is about two to about four inches, and more preferably about three inches. A preferred spring outside diameter is about 0.25 inches to about 0.75 inches, with about 0.50 inches being more preferred. A preferred wire gauge or thickness is between about 22 AWG (0.0253 inches) and about 14 AWG (0.0641 inches), with about 17 AWG (about 0.046 inches) being most preferred. A preferred predetermined number of spring coils is about 10 to about 25, with about nineteen being more preferred.

A second trigger rig 400' is shown in FIG. 11. Like the first rig 400, the second rig embodiment 400' includes a second line 20 and a third line 30. In this rig 400', however, there is located a trigger set mechanism 410 between the sleeve 3110 and the hook 50. The trigger set mechanism 410 is configured to allow a user of the device 3000 to activate the biasing member 3240. Whereas, a trigger set mechanism (including the rod 132) of the first embodiment 100 extended proximally from the device 100, towards a support structure or fishing rod 40, the set mechanism 410 of the present embodiment 400' is arranged distally from the device 3000. The trigger set mechanism 400' includes a pull-loop 32 located between the ball 3262 and the connection point 402 to the second fishing line 20. The pull-loop 32 may be integrally formed with the third line 30, such as the third line 30 being bent back upon itself and secured with a crimp collar 404. The crimp collar 404, or other modification or attachment to the third line 30 is preferably located at a distance along the third line 30 that is greater than the distance PB between the puck biasing surface 3133 and the ball 3262 as to not interfere with the hook setting action, which is described in more detail below.

The activation member assembly 3180 comprises a base 3182 and a finger 3200. The base 3182 preferably comprises base external threads 3184, a base collar 3186 having an inwardly facing surface 3188 and an outwardly facing surface 3190, a base bore 3192 defining a base bore surface 3194 (see FIG. 15B), and a base slot 3198 (see FIGS. 14B and 14C) extending across the base collar 3186 and from the outwardly facing surface 3190 substantially to the inwardly facing surface 3188. The base slot 3198 has a base slot first surface 3250 opposing a base slot second surface 3252 across and defining a base slot width W.

Figure 14A:
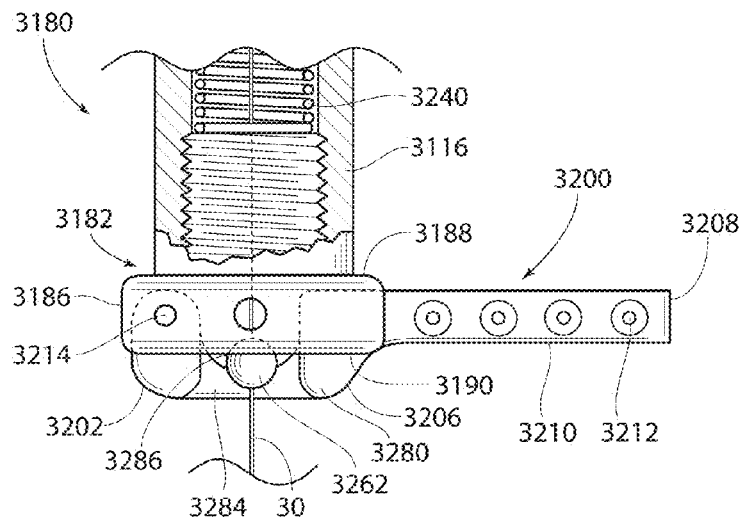
FIGS. 14A-14C are partial cross-sectional views of the hook setting device shown in FIG. 11.
Figure 14B:
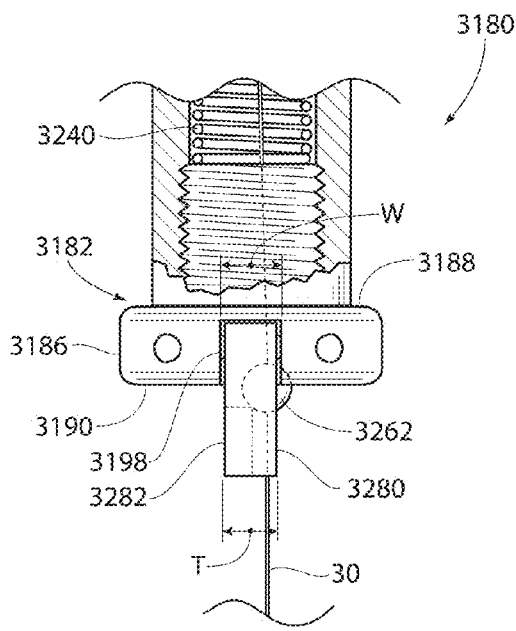
Figure 14C:
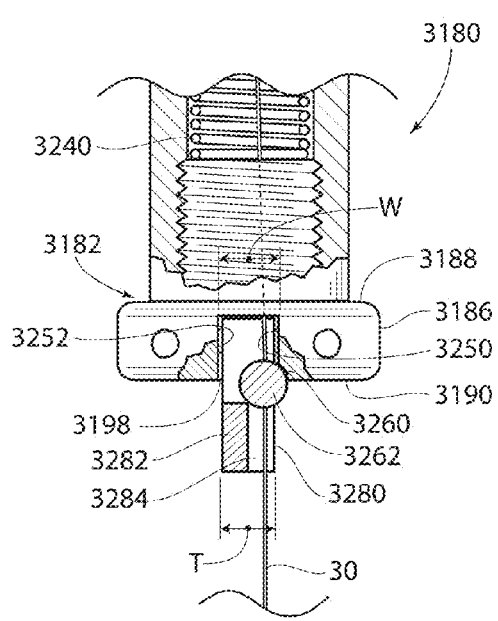

Additionally or alternatively, as shown in FIG. 14C, a seat 3260 is set inward from and located at the intersection of the outwardly facing surface 3190 and at or near the center of the base slot first surface 3250.

The finger 3200 preferably comprises a finger proximal end portion 3202, a finger medial portion 3206, and a finger distal end portion 3208. The finger proximal end portion 3202 and the finger medial portion 3206 preferably have a thickness T that is smaller in dimension than the base slot width W.

The finger proximal end portion 3202 is rotatably attached to the base 3182 within the base slot 3198 at a pivot point defined by a pivot pin 3214.

The finger medial portion 3206 has a medial portion first surface 3280 opposite a medial portion second surface 3252. A notch 3284 in the finger medial portion 3206 extends from the medial portion first surface 3280 toward the medial portion second surface 3252.

A finger lever 3210 extends from the finger medial portion 3206 through the finger distal end portion 3208. The finger lever 3210 preferably comprises a plurality of holes 3212 formed at different distances from the pivot point 3214. The second line 20 is secured to the lever 3210 in at least one of the holes 3212, such as being tied directly therein or by using a snap 406, or other attachment device, such as a swivel or leader.

Looking at FIGS. 12 and 14A-14C, the device 3000 is shown in an engaged position. In the engaged position, the biasing member 3240 is compressed between the puck 3132 and the base 3182. The biasing member 3240 is retained in the compressed state by the placement of the ball 3262 within the notch 3284 and against the base collar 3186. As discussed above, the distance PB between the puck biasing surface 3133 and the ball 3262 will determine the amount of potential energy stored in the biasing member 3240 when in the engaged position. For example, the greater the distance PB between the puck biasing surface 3133 and the ball 3262, the less a given biasing member 3240 will compress and therefore a lower amount of potential energy will be stored in the compressed biasing member 3240.

As depicted here, it is contemplated that a section of the notch 3284 extends through the medial portion second surface 3282 to form a cut-out 3286 through a part of the finger medial portion 3206 that is substantially within the base slot 3198 when the finger 3200 is positioned in an engaged position. The cut-out 3286 has a terminus 3288 (see FIG. 13) preferably configured to extend beyond the base collar outwardly facing surface 3190 for a distance less than the ball diameter BD when the finger 3200 is positioned in an engaged position, or not at all. A preferred ball diameter BD may be, for example, about 3/16 of an inch.

Figures 15A, 15B:
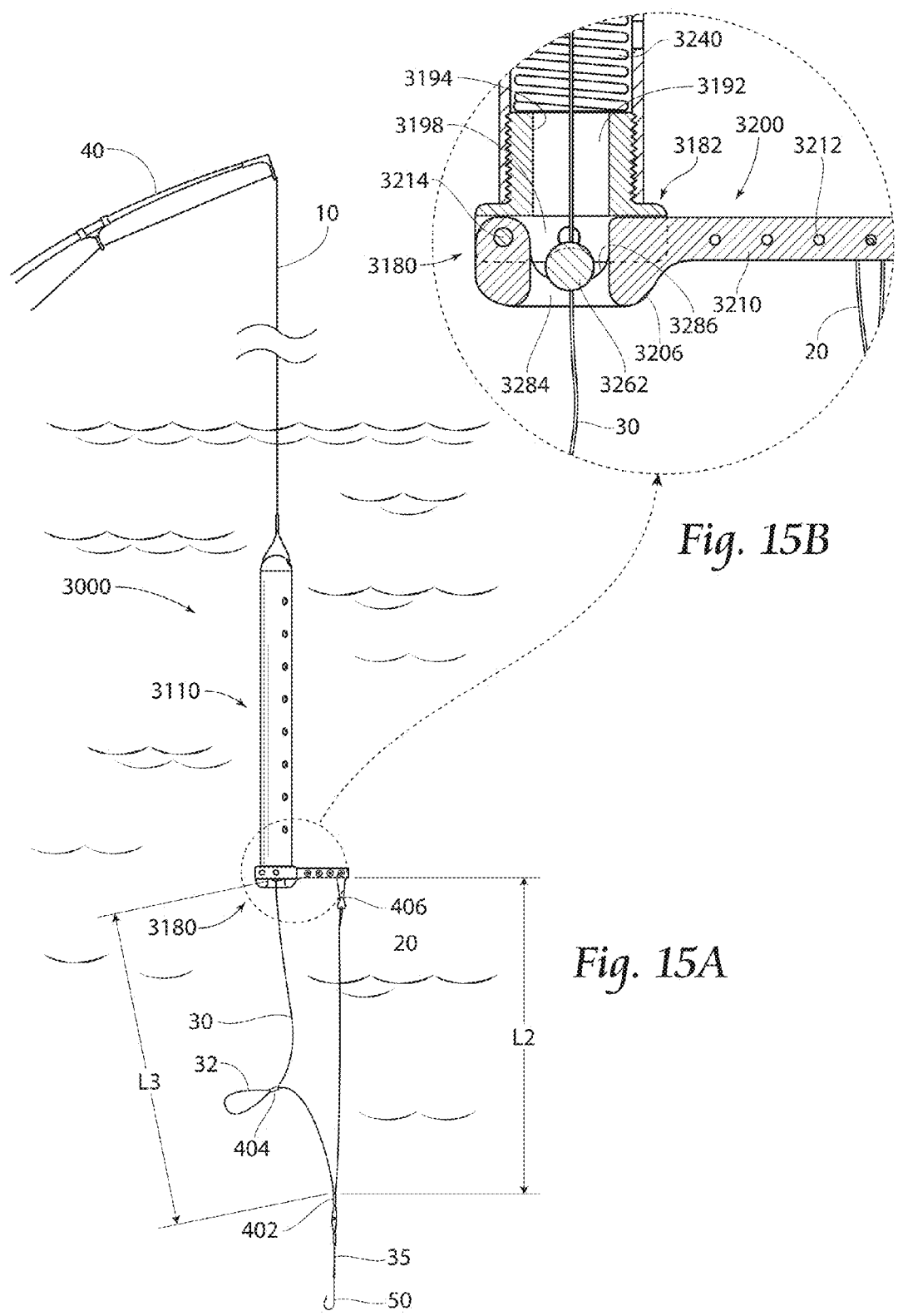
FIGS. 15A and 15B are views of the hook setting device of FIG. 11 in a first state.
Figure 21A:
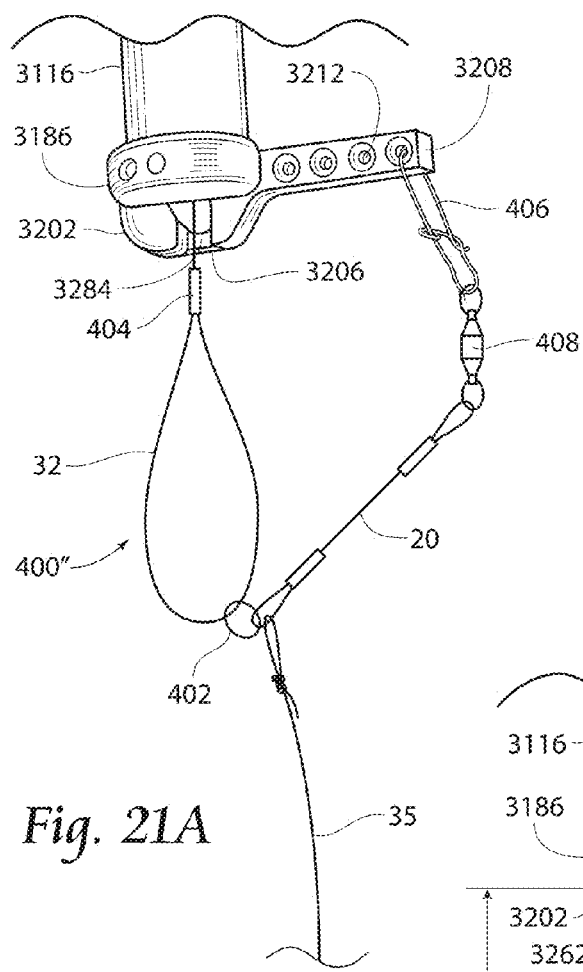
FIG. 21A is a first perspective view of a third embodiment of a trigger rig according to the present invention.
Figure 21B:
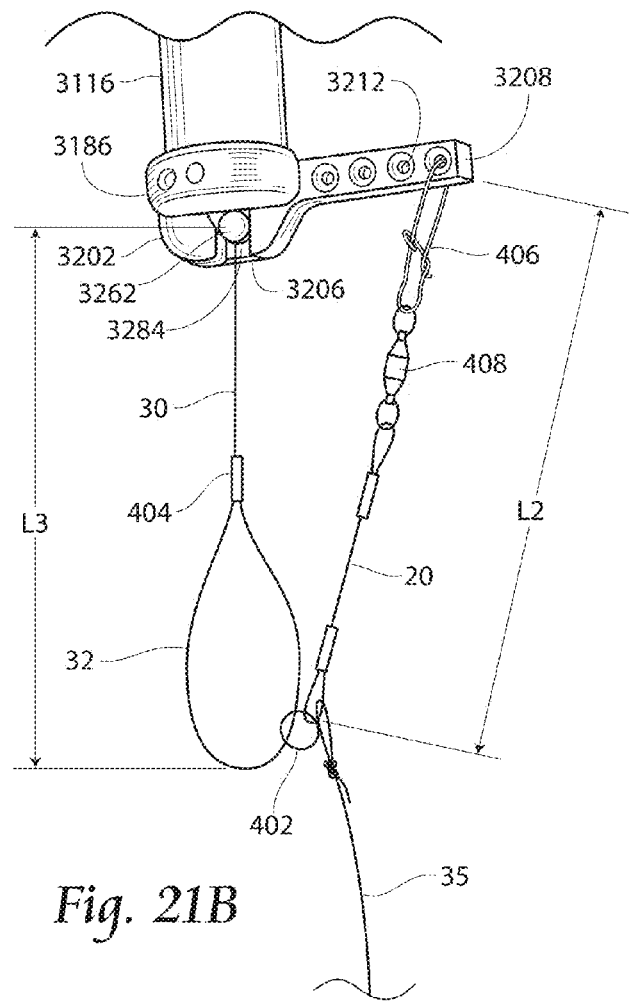
FIG. 21B is a second perspective view of the embodiment of FIG. 21A.

Turning now to FIGS. 15A-17B, the operation of the hook setting device 3000 is illustrated. Similar to the first embodiment 100, FIG. 15A shows the first, second, and third fishing lines 10,20,30 connected in a similar manner and configured to be sized within similar length parameters.

In FIGS. 15A and 15B, the hook setting device 3000 is shown in the engaged position as described above with respect to FIGS. 12 and 14A-14C. When the fish 60 approaches and bites the hook 50 as illustrated in FIGS. 16A and 16B, the second fishing line 20 is pulled tight and the finger lever 3210 rotates about the pivot point 3214. Rotation of the finger lever 3210 away from base slot 3198 moves the finger medial portion 3206 relative to the ball 3262 until the finger medial portion 3206 is no longer in contact with the ball 3262 and thus releasing the ball 3262 from the notch 3284 and into the cut-out 3286.

As the biasing member 3240 releases the stored energy as shown in FIGS. 17A and 17B and forces the puck 3132 (not shown) in the direction away from the base 3182. The movement of the puck 3132 and the force of the biasing member 3240 sets the hook 50 in the fish 60.

The plurality of lever holes 3212 allow an angler to set the amount of force needed for a fish 60 to release the plunger assembly 3130. If less force is preferred, the angler may attach the second fishing line 20 in one of the plurality of lever holes 3212 closer to the finger distal end portion 3208. If more force is preferred, the angler may attach the second fishing line 20 to one of the plurality of lever holes 3212 closer to the finger medial portion 3206.

FIG. 18 shows a user 70 pulling the pull-loop 32 in a direction away from the base 3182 to set the activation member assembly 3180 into the engaged position. It is preferable to the position the device as shown here during the setting procedure. As the ball 3262 (hidden) is being pulled towards the base outwardly facing surface 3190 the ball 3262 (hidden) will contact the finger 3200 and the finger 3200 will rotate away from the base outwardly facing surface 3190. Continued pulling by the user 70 will place the ball 3262 (hidden) beyond the base outwardly facing surface 3190 allowing gravity to assist the finger 3200 back towards the base outwardly facing surface 3190. The ball 3262 (hidden) will then be positioned between the finger notch 3284 and the base outwardly facing surface 3190, effectively blocking the path of the ball 3262 (hidden) back into the sleeve 3110.

FIGS. 19A and 19B illustrate a fourth embodiment 4000 of the hook setting device. The hook setting device 4000 comprises a sleeve 4110, a plunger assembly 4130, an activation member assembly 4180, and a biasing member 4240.

The sleeve 4110 comprises a tubular pipe 4112 having a first end portion 4114 and a second end portion 4116 with at least one passage 4120 extending between the first end portion 4114 and the second end portion 4116.

The plunger assembly 4130 comprises a puck 4132, an arm 4160 extending downward toward the activation member assembly 4180, and at least one handle 4290 protruding outward from the puck 4132 and extending through the at least one passage 4120. The distal end portion 4164 of the arm 4160 has a ball 4262.

The activation member assembly 4180 is similar to the activation member assembly 3180 of the third embodiment hook setting device 3000 as it comprises a base 4182 with a base slot 4198 in which a finger 4200 with a notch 4284 in a medial portion 4206 is rotatable in and out of the base slot 4198 about a pivot point 4214.

The device 4000 is engaged by pulling or pushing the at least one handle 4290 of the puck 4132 toward the sleeve second end portion 4116 and/or pulling the loop 32 of the third fishing line 30 away from the base 4182, and positioning the ball 4262 between the notch 4284 and the base 4182.

The device 4000 disengages in a similar manner to the third embodiment 3000 whereby when the second fishing line 20 is pulled, the finger 4200 rotates about the pivot point 4214 and out of the base slot 4198, thus releasing the ball 4262 and the potential energy of the biasing member 4240 to pull the third fishing line 30 in an upward direction.

FIGS. 20A and 20B illustrate a fifth embodiment 5000 of the hook setting device. The hook setting device 5000 comprises a sleeve 5110, a plunger assembly 5130, an activation member assembly 5180, and a biasing member 5240.

The sleeve 5110 is similar to that of the sleeve 4110 of the fourth embodiment 4000 and comprises a passage 5120 extending between a first end portion 5114 and a second end portion 5116 of a tubular pipe 5112.

The plunger assembly 5130 shares many commonalities with the plunger assembly 4130 of the fourth embodiment 4000 and comprises a puck 5132, an arm 5160 extending downward toward the activation member assembly 5180, and at least one handle 5290 protruding outward from the puck 5132 and extending through the at least one passage 5120. The distal end portion 5164 of the arm 5160, however, has an offset bulb 5166.

The activation member assembly 5180 comprises a base 5182 with a base slot 5198 in which a finger 5200 with a notch 5284 in a medial portion 5206 is rotatable in and out of the base slot 5198 about a pivot point 5214. The medial portion 5206 has a lobe 5292 which projects into the notch 5284 from the side closest to the finger distal end portion 5208 and in the direction of the finger proximal end portion 5202.

The device 5000 is engaged by pulling or pushing the at least one handle 5290 of the puck 5132 toward the sleeve second end portion 5116, and/or pulling the loop 32 of the third fishing line 30 away from the base 5182, and engaging the offset bulb 5166 with the lobe 5292 of the medial portion 5206.

The device 5000 disengages when the second fishing line 20 is pulled and the finger 5200 rotates about the pivot point 5214 and out of the base slot 5198. The offset bulb 5166 is released from its engagement with the lobe 5292 and the potential energy of the biasing member 5240 is released, pulling the third fishing line 30 in an upward direction.

Figure 22:
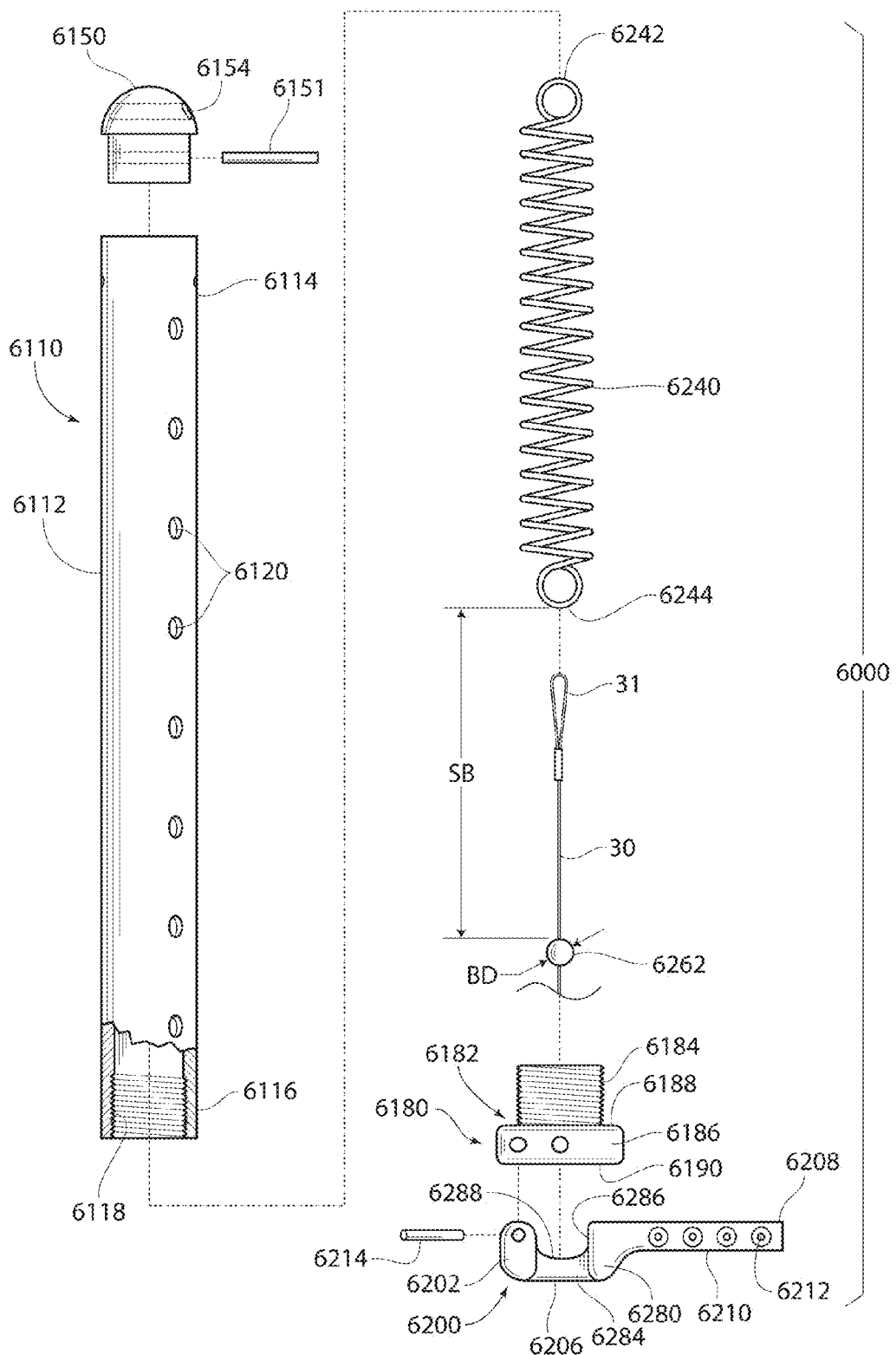
FIG. 22 is an exploded view of a sixth embodiment of a fish hook system according to the present invention.

A sixth embodiment 6000 of a fish hook system according to the present invention is shown in FIG. 22, where like reference numerals refer to identical or similar structure as described in connection with previous embodiments. This embodiment 6000 is substantially similar to the third embodiment 3000, but for the biasing arrangement. In this arrangement, the biasing member 6240 is stretched or extended to a trigger set state, rather than being compressed. The biasing member 6240 is preferably a double loop over center tension spring extending between and including a looped proximal end 6242 and a looped distal end 6244 having a free length, an outside diameter, a wire gauge or thickness, and a predetermined number of coils. A preferred nominal spring free length is about two to about four inches, and more preferably about 2.125 inches. A preferred spring outside diameter is about 0.25 inches to about 0.75 inches, with about 0.40 inches being more preferred. A preferred wire gauge or thickness is between about 22 AWG (0.0253 inches) and about 14 AWG (0.0641 inches), with about 18 AWG (about 0.041 inches) being most preferred. A preferred predetermined number of spring coils is about 30 to about 60, with about 51 being more preferred.

A preferred biasing member 6240 comprises a double loop over center extension spring having a free length (including loops), an outside diameter, a wire gauge or thickness, and a predetermined number of coils. A preferred nominal spring free length is about two to about four inches, and more preferably about 2.1 inches. A preferred spring outside diameter is about 0.25 inches to about 0.75 inches, with about 0.40 inches being more preferred. A preferred wire gauge or thickness is between about 22 AWG (0.0253 inches) and about 14 AWG (0.0641 inches), with about 18 to about 17 AWG (about 0.042 inches) being most preferred. A preferred predetermined number of spring coils is about 30 to about 70, with about 50 or 51 being more preferred.

The proximal end 6242 of the biasing member 6240 may be secured closer to the pipe first end portion 6114 than the second end portion 6116, such as by being looped over the cap pin 6151. The distal end 6244 of the biasing member 620 is generally longitudinally translatable within the pipe 6112 between at least a set or loaded position, further from the first end portion 6114 and a fired position, closer to the first end portion 6114. The loop 31 of the third line 30 may be secured directly to the biasing member 6240, such as at the looped distal end 6244, to secure the ball 6262 at a preferred distance SB therefrom. Though not shown particularly, it is to be understood that this embodiment 6000 could be used with or include any trigger rig (e.g., 400, 400', 400") described herein. The operation of this embodiment, from an external perception, is substantially similar to the operation of the third embodiment 3000. One additional feature of this embodiment 6000 is that once the device has been triggered (and a fish is hooked), causing the biasing member 6240 to draw the third line 30 into the pipe 6112, the third line 30 may be drawn out of the pipe 6112 for a distance that may be greater than the length L2 of the second line 20 (not shown) of the trigger rig (e.g. 400, 400', 400"). Such available play in the third line 30 may be advantageous to a fisherman by allowing the hooked fish to wear itself out and lessen its fight.

Another embodiment 7000 of a fish hook system according to the present invention is shown in FIGS. 23A-24D, where like reference numerals refer to identical or similar structure as described in connection with previous embodiments. This embodiment 7000 offers the post-firing (i.e. after a fish is hooked) ability for the third line 30 to be drawn out of the pipe 7112 against a biasing force of the biasing member 7240. Additionally, this embodiment does not employ a second line 20, as is used in other embodiments disclosed herein. Rather, the trigger rig 7500 used in this embodiment includes a second end cap 7580, which may be secured to the second end portion 7116 of the pipe 7112. The cap 7580 preferably has an aperture 7192 formed therethrough, in communication with an interior cavity of the pipe 7112. The aperture 7192 may generally be aligned axially with a longitudinal axis 7112a of the pipe 7112. Extending radially from the aperture 7192 is a trigger slot 7582. The trigger slot 7582 extends from the aperture 7192 to a terminal end 7584, which is preferably formed in the cap 7580, but may alternatively be formed in the pipe 7112. Optionally, one or more dimples 7586 are formed along the slot 7582, the dimples 7586 being preferably centered on the slot 7582. The one or more dimples 7586 may be formed with a radius that approximates the radius of the ball 7262.

To use this embodiment 7000, the third line 30 is pulled in a first longitudinal direction 71, against the bias force of the biasing member 7240, as can be seen in FIG. 24A. A force to pull the third line 30 may be applied to any portion of the line 30, such as a loop 32 formed therein. A fourth line 35 may be coupled to the third line 30, such as by being tied or otherwise secured to the loop 32, or through the use of a snap, swivel, leader, etc. A hook (not shown, but previously 50) is attached to the distal end of the fourth line 35. The third line 30 is pulled in the first direction 71 for a distance to withdraw the ball 7262 through the aperture 7192. After the ball 7262 has been drawn through the aperture 7192, the third line 30 may be moved in a second direction 72, which is preferably a radial direction with respect to the pipe 7112, as shown in FIG. 24B. This radial movement will draw the line 30 into the trigger slot 7582 and allow the ball 7262 to be positioned on the outside of the cap 7580 and at a position along the slot 7582, such as at an indexed location defined by one of the dimples 7586.

Figure 24D:
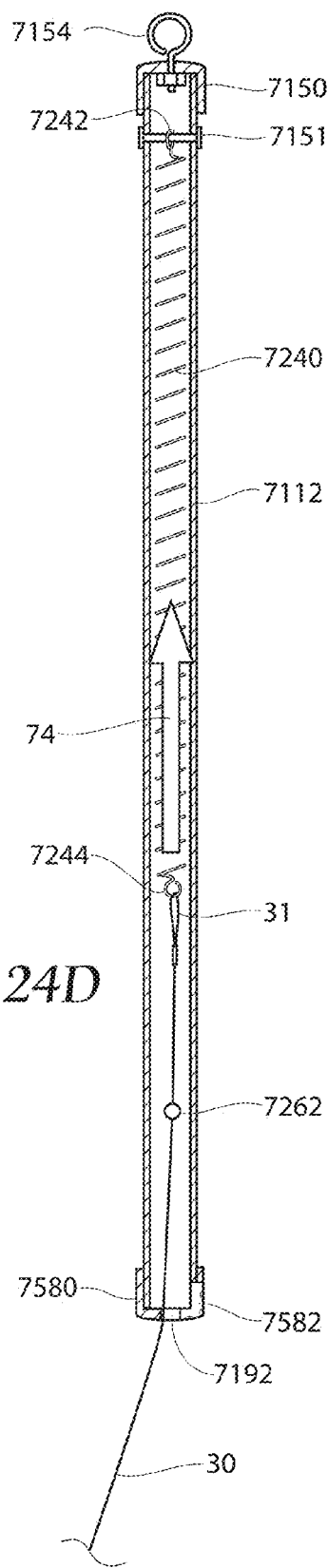

FIGS. 24C-D depict the triggering action of the system 7000. A downward force applied to the third line 30 will cause the line 30 to move in a third direction 73 (which is substantially opposite the second direction 72) to coaxially realign with the pipe 7112. The movement in the third direction 73 will bring the ball 7262 into axial alignment with the aperture 7192, allowing the bias force of the biasing member 7240 to draw the third line 30 towards the pipe first end 7114 in a fourth direction 74, as shown in FIG. 24D. Accordingly, a hook (e.g., hook 50) secured to the fourth line 35 will be forced toward the pipe 7112.

A preferred biasing member 7240 comprises a double loop over center extension spring having a free length (including loops), an outside diameter, a wire gauge or thickness, and a predetermined number of coils. A preferred nominal spring free length is about three to about six inches, and more preferably about 4.5 inches. A preferred spring outside diameter is about 0.25 inches to about 0.75 inches, with about 0.5 (or 0.47) inches being more preferred. A preferred wire gauge or thickness is between about 22 AWG (0.0253 inches) and about 14 AWG (0.0641 inches), with about 18 to about 17 AWG (about 0.042 inches) being most preferred. A preferred predetermined number of spring coils is about 50 to about 120, with about 90 or 92 being more preferred. Alternatively, the biasing member 7240 may be a compression spring and puck arrangement, similar or identical to that described previously in connection with the third embodiment 3000.

The foregoing is considered as illustrative only of the principles of the invention. Furthermore, since numerous modifications and changes will readily occur to those skilled in the art, it is not desired to limit the invention to the exact construction and operation shown and described. For instance, in connection with the seventh embodiment 7000, the lines discussed (third line 30 and fourth line 35) are referred to by indexed numerals, it is understood that the particular embodiment does not include a second line 20, as described in connection with previous embodiments. Accordingly, the indexed numerical references should not be interpreted as requiring a particular number of lines, but only as identifiers. While the preferred embodiment has been described, the details may be changed without departing from the invention, which is defined by the claims.

We claim:

1. A fish hook system comprising:
    a sleeve extending between a sleeve proximal end portion and a sleeve distal end portion;
    a trigger lever extending from and including a free end and a pivot end, the pivot end being pivotally coupled to the sleeve distal end portion, the trigger lever being movable between a first position and a second position;
    a biasing member disposed within the sleeve;
    a first line extending out of the sleeve distal end portion, the first line including and extending between a first line proximal end and first line distal end, the first line proximal end being coupled to the biasing member and the first line distal end being disposed outside of the sleeve;

a hook coupled to the first line; and a catch affixed to the first line, wherein the catch engages at least the trigger lever in the first position, after the first line has been drawn out of the sleeve distal end portion against a biasing force of the biasing member, and wherein the catch releases from the trigger lever when the trigger lever is at a rotational position between the first position and the second position and at the second position, and when the catch releases from the trigger lever, the biasing member causes the first line to be drawn at least partially into the sleeve.

2. A fish hook system according to claim 1, wherein the biasing member is a spring.

3. A fish hook system according to claim 2, wherein the biasing member is an extension spring.

4. A fish hook system according to claim 3, wherein the extension spring is a double loop over center extension spring having a proximal loop and a distal loop, the first line being secured directly the distal loop.

5. A fish hook system according to claim 4, wherein the proximal loop is coupled to the sleeve proximal end portion.

6. A fish hook system according to claim 4, further including a pin extending through the sleeve and through the proximal loop.

7. A fish hook system according to claim 2, wherein the biasing member is a compression spring.

8. A fish hook system according to claim 1, wherein the catch is a ball.

9. A fish hook system according to claim 1, wherein the first line is a stainless steel, braided cable and the ball is swaged to the line.

10. A fish hook system according to claim 1, wherein the catch is a knot in the first line.

11. A fish hook system according to claim 1, further comprising:

a second line extending between and including a proximal end and a distal end, the proximal end being coupled to the trigger lever between the trigger lever pivot end and the trigger lever free end and the distal end being coupled to the first line; and a third line extending between and including a proximal end and a distal end, the proximal end being coupled to the distal end of the second line, wherein the hook is coupled to the first line by being attached to the distal end of the third line, and wherein the trigger lever is moved from the first position towards the second position by a force applied to the third line in a direction away from the distal end of the sleeve.

12. A fish hook system comprising:

a sleeve extending along a longitudinal axis between a sleeve proximal end portion and a sleeve distal end portion, the sleeve distal end portion comprising a slot;

a biasing member disposed within the sleeve;

a first line extending out of the sleeve distal end portion, the first line including and extending between a first line proximal end and first line distal end, the first line proximal end being coupled to the biasing member and the first line distal end being disposed outside of the sleeve;

a hook coupled to the first line distal end; and a catch affixed to the first line, wherein the catch is engageable with at least edges of the slot, after the first line has been drawn out of the sleeve distal end portion against a biasing force of the biasing member, and wherein the catch releases from the slot when the first line approaches a position that is coaxial with the longitudinal axis of the sleeve, and when the catch releases from the slot, the biasing member causes the first line to be drawn at least partially into the sleeve.

13. A fish hook system according to claim 12, wherein the biasing member is a spring.

14. A fish hook system according to claim 13, wherein the biasing member is an extension spring.

15. A fish hook system according to claim 14, wherein the extension spring is a double loop over center extension spring having a proximal loop and a distal loop, the first line being secured directly the distal loop.

16. A fish hook system according to claim 15, wherein the proximal loop is coupled to the sleeve proximal end portion.

17. A fish hook system according to claim 15, further including a pin extending through the sleeve and through the proximal loop.

18. A fish hook system according to claim 13, wherein the biasing member is a compression spring.

19. A fish hook system according to claim 12, wherein the catch is a ball.

20. A fish hook system according to claim 12, wherein the first line is a stainless steel, braided cable and the ball is swaged to the line.

21. A fish hook system according to claim 12, wherein the catch is a knot in the first line.

* * * * *